US012560780B2

(12) United States Patent
Seo et al.

(10) Patent No.: US 12,560,780 B2
(45) Date of Patent: Feb. 24, 2026

(54) LENS ASSEMBLY AND ELECTRONIC DEVICE INCLUDING THE SAME

(71) Applicant: Samsung Electronics Co., Ltd., Gyeonggi-do (KR)

(72) Inventors: Jinseon Seo, Gyeonggi-do (KR); Jaecheol Bae, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 429 days.

(21) Appl. No.: 18/087,952

(22) Filed: Dec. 23, 2022

(65) Prior Publication Data

US 2023/0204907 A1      Jun. 29, 2023

Related U.S. Application Data

(63) Continuation of application No. PCT/KR2022/021211, filed on Dec. 23, 2022.

(30) Foreign Application Priority Data

Dec. 23, 2021    (KR) ........................ 10-2021-0186560
Mar. 16, 2022    (KR) ........................ 10-2022-0032832

(51) Int. Cl.
*G02B 9/60*          (2006.01)
*G02B 13/00*         (2006.01)
           (Continued)

(52) U.S. Cl.
CPC ........... *G02B 9/60* (2013.01); *G02B 13/0045* (2013.01); *G02B 13/06* (2013.01); *H04N 23/55* (2023.01); *H04N 25/61* (2023.01); *G03B 30/00* (2021.01)

(58) Field of Classification Search
None
See application file for complete search history.

(56) References Cited

U.S. PATENT DOCUMENTS 8,699,150 B1      4/2014   Hsieh et al.
2011/0316969 A1   12/2011  Hsieh et al.
            (Continued)

FOREIGN PATENT DOCUMENTS

CN          108983401 A      12/2018
CN          112014953 A      12/2020
            (Continued)

OTHER PUBLICATIONS

Extended European Search Report dated Dec. 10, 2024.
            (Continued)

*Primary Examiner* — Darryl J Collins
(74) *Attorney, Agent, or Firm* — Sughrue Mion, PLLC

(57)          ABSTRACT
According to an embodiments of the disclosure, electronic device comprise: a lens assembly including a plurality of lenses aligned along an optical axis direction from an object side to an image side and including a first lens having a convex surface in a first direction parallel to the optical axis direction and toward the object; a second lens having a convex lens in the first direction; a third lens having a positive refractive power; a fifth lens having a positive refractive power; and a sixth lens; and an image sensor including an imaging plane configured to form an image. The electronic device may be implemented as a compact and high-resolution optical device. The lens assembly may be diversified according to embodiments, and other various lens assemblies and electronic devices with the same may be provided, according to various embodiments.

20 Claims, 14 Drawing Sheets

(51) Int. Cl.

| | | |
|---|---|---|
| *G02B 13/06* | (2006.01) | |
| *H04N 23/55* | (2023.01) | |
| *H04N 25/61* | (2023.01) | |
| *G03B 30/00* | (2021.01) | |

(56) References Cited

U.S. PATENT DOCUMENTS

| | | | |
|---|---|---|---|
| 2012/0069140 | A1 | 3/2012 | Tsai et al. |
| 2012/0099005 | A1 | 4/2012 | Kali et al. |
| 2017/0108671 | A1* | 4/2017 | Eguchi ................... G02B 13/06 |
| 2017/0146811 | A1 | 5/2017 | Son |
| 2017/0227741 | A1 | 8/2017 | Dai et al. |
| 2017/0353634 | A1 | 12/2017 | Kim et al. |
| 2018/0335618 | A1 | 11/2018 | Huang et al. |
| 2018/0341086 | A1 | 11/2018 | Tseng et al. |
| 2018/0376042 | A1 | 12/2018 | Kim et al. |
| 2019/0121097 | A1 | 4/2019 | Huang |
| 2019/0391366 | A1 | 12/2019 | Yamazaki |
| 2020/0192061 | A1 | 6/2020 | Liao |
| 2020/0292790 | A1 | 9/2020 | Jung et al. |
| 2020/0400923 | A1 | 12/2020 | Song et al. |
| 2021/0132337 | A1 | 5/2021 | Lin et al. |
| 2021/0318519 | A1 | 10/2021 | Ma |
| 2022/0035135 | A1* | 2/2022 | Wang ................. G02B 13/0045 |
| 2022/0113503 | A1 | 4/2022 | Si |
| 2022/0236536 | A1* | 7/2022 | Dang ................. G02B 13/0045 |

FOREIGN PATENT DOCUMENTS

| | | | |
|---|---|---|---|
| CN | 113341535 | A | 9/2021 |
| JP | 2010-8562 | A | 1/2010 |
| JP | 2018-205521 | A | 12/2018 |
| JP | 2021-162843 | A | 10/2021 |
| KR | 10-2012-0030355 | A | 3/2012 |
| KR | 10-2017-0059806 | A | 5/2017 |
| KR | 10-2017-0108651 | A | 9/2017 |
| KR | 10-1785458 | B1 | 10/2017 |

OTHER PUBLICATIONS

Herbert Gross et al:Hnadbook of Optical Systems;XP 055237921.
Warren J.Smith:Modern Lens Design; XP055152035.
International Search Report dated Mar. 24, 2023.

* cited by examiner

LONGITUDINAL
SPHERICAL ABER.

656.2725NM
587.5618NM
546.0740NM
486.1327NM
435.8343NM

FOCUS (MILLIMETERS)

LENS ASSEMBLY AND ELECTRONIC DEVICE INCLUDING THE SAME

CROSS-REFERENCE TO RELATED APPLICATIONS

This application is a continuation of International Application No. PCT/KR2022/021211 designating the United States, filed on Dec. 23, 2022, in the Korean Intellectual Property Receiving Office and claiming priority to Korean Patent Application No. 10-2021-0186560, filed on Dec. 23, 2021, in the Korean Intellectual Property Office, and Korean Patent Application No. 10-2022-0032832, filed on Mar. 16, 2022, in the Korean Intellectual Property Office, the disclosures of all of which are incorporated by reference herein in their entireties.

BACKGROUND

Technical Field

Various embodiments of the disclosure relate to a lens assembly that may be disposed in a small electronic device, such as, e.g., a portable terminal, and more specifically, a bezel-less lens assembly, thereby making the electronic devices thinner while providing an ultra-wide angle.

Background Art

To obtain high-quality images and/or videos, the optical device may include an optical system including a lens assembly including a plurality of lenses and an image sensor having a high pixel count. The lens assembly may have a lower F-number (Fno) and smaller aberration, thereby making it possible to obtain high-quality (high resolution) images and/or videos. Obtaining a lower F-number and smaller aberration, that is, a higher resolution and brighter images, calls for a combination of multiple lenses. If including more pixels, the image sensor may have a higher pixel count, and an image sensor with a higher pixel count may obtain higher-resolution images and/or videos. To implement a high-pixel image sensor in a limited mounting space in an electronic device, a plurality of pixels having a very small size, e.g., pixels in micrometers.

Portable electronic devices that are more compact and thinner are easier to carry. This may limit on the size of the lens structure. Conventional optical systems may have a structure disadvantageous in reducing the overall length when implementing an ultra-wide angle. For example, to implement an ultra-wide angle of view of 100 degrees or more, the effective diameter of the first lens from the object side may be too large to reduce the size of the optical system.

According to an embodiment of the disclosure, there are provided a lens assembly with a compact lens structure with a reduced overall length and an ultra-wide angle and an electronic device including the lens assembly.

SUMMARY

According to various embodiments of the disclosure, there may be provided an electronic device comprising a lens assembly including a plurality of lenses aligned along an optical axis direction from an object side to an image side, wherein the plurality of lenses including, a first lens having a negative refractive power; a second lens having a positive refractive power; a third lens; a fourth lens; and a fifth lens having a negative refractive power; and an image sensor including an imaging plane configured to form an image; wherein the lens assembly satisfies conditional equation 1 and conditional equation 2.

$$0.2 < L1\ ape/\text{Imag}H < 0.4 \qquad \text{[conditional equation 1]}$$

$$100 < FOV < 140 \qquad \text{[conditional equation 2]}$$

where 'L1 ape' is half an effective diameter of the first lens, and 'ImagH' is half a diagonal length of the image sensor, and in conditional equation 2, where 'FOV' is a field of view of an entire optical system including the lens assembly and the image sensor.

According to various embodiments of the disclosure, there may be provided an electronic device comprising a lens assembly including a plurality of lenses aligned along an optical axis direction from an object side to an image side, wherein the plurality of lenses including, a first lens having a negative refractive power; a second lens having a positive refractive power; a third lens; a fourth lens; and a fifth lens having a negative refractive power; an image sensor including an imaging plane, the image sensor configured to form an image; and an aperture disposed between the first lens and the second lens; wherein an effective diameters of the first lens and an effective diameter of the second lens are smaller than effective diameters of the third lens, the fourth lens, and the fifth lens, and wherein the lens assembly satisfies conditional equation 1 and conditional equation 2.

$$0.2 < L1\ ape/\text{Imag}H < 0.4 \qquad \text{[conditional equation 1]}$$

$$100 < FOV < 140 \qquad \text{[conditional equation 2]}$$

where 'L1 ape' is half an effective diameter of the first lens, and 'ImagH' is half a diagonal length of the image sensor, and in conditional equation 2, where 'FOV' is a field of view of an entire optical system including the lens assembly and the image sensor.

DETAILED DESCRIPTION

Figure 1:
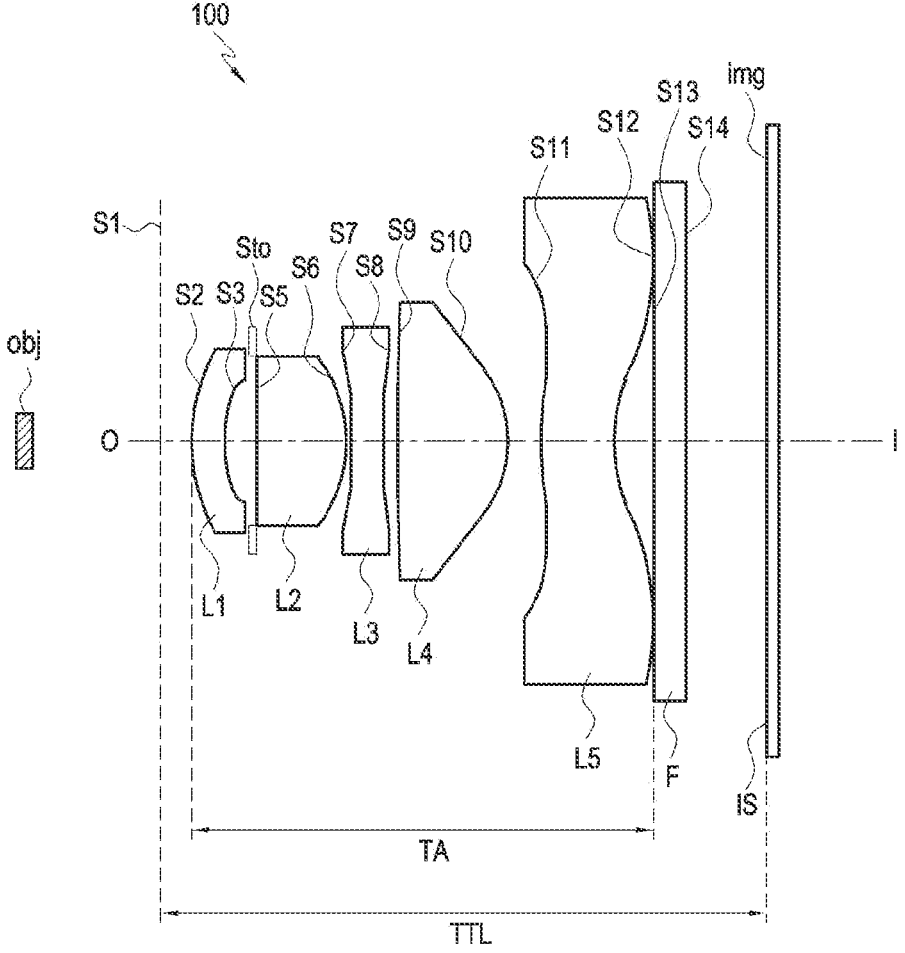
FIG. 1 is a view illustrating a configuration of an optical system including an image sensor and a lens assembly according to an embodiment.

According to an embodiment of the disclosure, although the first lens has a small effective diameter, five or more optical systems having the optimal power to implement an ultra-wide angle are provided, thereby making the electronic device more compact and/or thinner.

According to an embodiment of the disclosure, the lens assembly may easily be equipped in a small and/or light-weight electronic device and contribute to expanding the optical functionality or enhancing the optical performance of the electronic device.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the electronic device may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a media box (e.g., Samsung HomeSync™, Apple TV™, or Google TV™), a gaming console (Xbox™ or PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs) of financial organizations, point of sales (POS) devices of stores, or Internet of things devices (e.g., a bulb, various sensors, a sprinkler, a fire alarm, a thermostat, a street light, a toaster, fitness equipment, a hot water tank, a heater, or a boiler). According to an embodiment of the disclosure, examples of the electronic device may at least one of part of furniture or building/structure, an electronic board, an electronic signature receiving device, a projector, or various measurement devices (e.g., devices for measuring water, electricity, gas, or electromagnetic waves). According to embodiments of the present invention, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device. According to an embodiment of the present invention, the electronic device is not limited to the above-listed embodiments.

Although limits or limitations to some numbers may be proposed herein, it should be noted that an embodiment of the disclosure are not limited by such numbers as long as the numbers are not shown in the claims.

Figure 2:
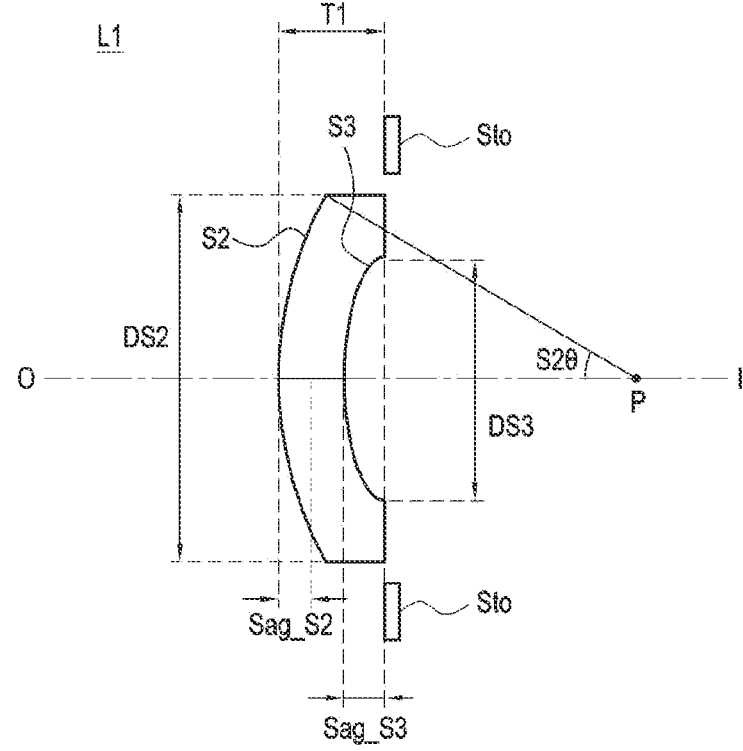
FIG. 2 is a view illustrating a lens included in a lens assembly according to an embodiment.

FIG. 1 is a view illustrating a configuration of an optical system including an image sensor and a lens assembly according to an embodiment. FIG. 2 is a view illustrating a lens included in a lens assembly according to an embodiment.

Referring to FIG. 1, according to one of an embodiment of the disclosure, a lens assembly 100 may include a plurality of lenses (e.g., L1, L2, L3, L4, and L5). According to an embodiment, an image sensor IS may be equipped in an electronic device. The lens assembly 100 including a plurality of lenses (e.g., L1, L2, L3, L4, and L5) may be mounted in the image sensor (IS)-equipped optical device and/or the electronic device, and constitute an optical system. The optical device may be, e.g., a camera. The following description may assume that the lens assembly 100 is mounted in the optical device. The optical device may be understood as further including a housing that protects the internal components and forms the exterior along with the optical system.

The image sensor IS may be a sensor that is mounted on a circuit board (not shown), aligned with the optical axis O-I, and may respond to light. The image sensor IS may include a sensor such as a complementary metal-oxide semiconductor (CMOS) or charge coupled device (CCD) sensor. The image sensor IS, however, is not limited thereto but may rather include various elements that convert light, e.g., an object image, into an electrical image signal. The image sensor IS may detect brightness, contrast ratio information, and/or color information about the object from the light which has been transmitted through the plurality of lenses (e.g., L1, L2, L3, L4, and L5), thereby obtaining an image for the object.

The plurality of lenses (e.g., L1, L2, L3, L4, and L5) included in the lens assembly 100 may include lenses formed of glass and/or synthetic resin (e.g., plastic) material. The lens assembly 100 may have an ultra-wide angle of view of about 100 degrees or more through a combination of the plurality of lenses. The image sensor IS may have a substantially rectangular (e.g., square) shape with the optical axis OI as a normal line, while having a small thickness. Further, the image sensor IS may have a size of about 2.0 mm or more image height (ImagH), and may include from hundreds of thousands of pixels to tens of millions or even hundreds of millions of pixels. For reference, image height ImagH may mean half of the diagonal length of the image sensor. According to an embodiment of the disclosure, there may be provided an optical system that includes the above-described lens assembly 100 and image sensor IS and may be configured compact with a slim factor of 1.1 or less. Each component of such optical system is described below in greater detail.

The lens assembly 100 may be disposed on the optical axis O-I passing through the centers of the plurality of lenses from the object (or external object) side O to the image side I. In describing the configuration of each lens below, 'object side' may denote the direction in which the object obj (the object that is being photographed) is present, and 'image side' may denote the direction an image forms on an imaging plane img. The 'object side-facing surface' of a lens may denote a surface towards the object on the optical axis O-I. This may mean the left (or front) surface of the lens as viewed from above the drawings of the disclosure. The 'image side-facing surface' of the lens may denote a surface towards the imaging plane img on the optical axis O-I, This may mean the right (or rear) surface of the lens as viewed from above the drawings of the disclosure. The imaging plane img may be a portion where, e.g., an image capturing element or image sensor IS is disposed, and an image forms. According to various embodiments, facing the object side O along the optical axis O-I with respect to at least one lens among the plurality of lenses included in the lens assembly 100 may be defined as 'facing in the first direction,' and facing the image side I along the optical axis O-I may be defined as 'facing in the second direction.' When a lens (e.g., a first lens L1) includes an object side (O)-facing surface, the object side (O)-facing surface may be said to face in the first direction. When a lens (e.g., the first lens L1) has an image side (I)-facing surface, the image side (I)-facing surface may be said to face in the second direction. Further, when the surface of each lens faces in the first direction or second direction when the center of the image sensor IS and/or the plurality of lenses is positioned on the optical axis O-I may be defined as the 'optical system including the plurality of lenses and/or the image sensor IS is aligned along the optical axis O-I.'

In describing the plurality of lenses (e.g., L1, L2, L3, L4, and L5), the portion of each lens, which is close to the optical axis O-I may be referred to as a chief portion. The portion further from the optical axis O-I (or around the edge of the lens) may be referred to as a marginal portion. The chief portion may be, e.g., a portion of a lens (e.g., the first lens L1) which crosses the optical axis O-I. The marginal portion may be, e.g., a portion of the lens (e.g., the first lens L1) which is spaced apart from the optical axis by a predetermined distance. The marginal portion may include an end portion of the lens which is positioned farthest from the optical axis O-I of the lens.

The radius of curvature, thickness, total track length (TTL), and focal length of a lens will be measured in millimeters unless stated otherwise. The thickness of a lens, the interval between lenses, or TTL (or overall length (OAL)) may be a distance measured from the center of the optical axis of the lens. In describing the shape of a lens, 'one surface of the lens is convex' may mean that the optical axis portion of the surface is convex. 'One surface of the lens is concave' may mean that the optical axis portion of the surface is concave. Thus, although one surface of a lens (e.g., the optical axis portion of the surface) is described as convex in shape, edge portions of the lens (e.g., portions a predetermined distance apart from the optical axis portion of the surface) may be concave. Likewise, although one surface of a lens (e.g., the optical axis portion of the surface) is described as concave in shape, edge portions of the lens (e.g., portions a predetermined distance apart from the optical axis portion of the surface) may be convex. As used herein, the term 'inflection point' may mean a point where the radius of curvature changes in a portion which does not cross the optical axis.

The lens assembly 100 may be advantageous in correcting aberrations including chromatic aberration by including five or more lenses. Referring to FIG. 1, according to an embodiment, the lens assembly 100 may include five lenses, as the plurality of lenses (e.g., L1, L2, L3, L4, and L5) sequentially arranged in, e.g., the optical axis O-I direction (e.g., the direction from the object O of FIG. 1 to the image I). The five lenses may be denoted as the first lens L1, the second lens L2, the third lens L3), the fourth lens L4, and the fifth lens L5 sequentially from the object side O. The plurality of lenses (e.g., L1, L2, L3, L4, and L5) may be aligned with the image sensor IS and the optical axis O-I.

To provide a compact optical device, the first lens L1 included in the lens assembly 100 may have a negative refractive power, the second lens L2 may have a positive refractive power, and the fifth lens L5 may have a negative refractive power. In the above-described embodiments, if light parallel with the optical axis O-I is incident onto the lens with a positive refractive power, the light, after passing through the lens, may be focused. For example, the lens with a positive refractive power may be a lens based on the principle of a convex lens. In contrast, if parallel light is incident onto the lens with a negative refractive power, the light, after passing through the lens, may be dispersed. For example, the lens with a negative refractive power may be a lens based on the principle of a concave lens. According to an embodiment, the third lens L3 and the fourth lens L4 may be disposed between the first lens L1, the second lens L2, and the fifth lens L5. In this case, the third lens L3 may have a negative refractive power, and the fourth lens L4 may have a positive or negative refractive power.

In the embodiment of FIG. 1, the first lens L1 has a negative refractive power and thus may disperse light. However, the first lens L1 has a negative refractive power and has a surface convex to the object side O, so that light may be collected at a very large angle of incidence from the optical axis O-I, forming an image. In other words, an ultra-wide angle of view may be implemented using the first lens L1. According to an embodiment, the fifth lens L5 having a negative refractive power may also have a surface S11 convex to the object side O to facilitate to secure the amount of light at the marginal portion by reducing the angle of incidence of the light incident on the imaging plane img.

A surface of at least one of the plurality of lenses (e.g., L1, L2, L3, L4, and L5) may be aspheric. The spherical aberration that may occur in the lens may be prevented by at least one of the plurality of lenses (e.g., L1, L2, L3, L4, and L5) having an aspheric surface. According to an embodiment, the fifth lens L5 may have the surfaces S11 and S12 of the fifth lens L5, which face the subject side O and the image side I, formed as aspheric surfaces and may include one or more inflection points. Accordingly, it is possible to prevent a coma from being generated in the marginal portion of the image sensor IS, to facilitate astigmatism control, and to reduce the occurrence of field curvature from the chief portion to the marginal portion of the imaging surface img of the image sensor.

The first lens L1 and the second lens L2 may be small-diameter lenses which have a relatively smaller effective diameter than the other lenses (the third lens L3, the fourth lens L4, and the fifth lens L2) in the lens assembly 100 including five lenses. Here, 'effective diameter' may mean a distance between one end and the other end of the lens in a direction perpendicular to the optical axis OI. Since the lens assembly should be installed in a limited space in the optical device and/or electronic device, the first lens L1 and the second lens L2 are implemented as small-diameter lenses to form a bezel-less design and, as the first lens L1 and the second lens L2 are configured as a lens having a negative refractive power and a lens having a positive refractive power, rear end portion, implementing a ultra-wide angle lens.

The lens assembly 100 may include at least one aperture sto. As the size of the aperture sto is adjusted, the amount of light reaching the imaging plane img of the image sensor IS may be adjusted. The position of the aperture sto may be disposed between the first lens L1 and the second lens L2. By disposing the aperture sto between the first lens L1 and the second lens L3, it may be effective to slim the electronic device and to effectively control spherical aberration and coma (also known as "comatic aberration").

In summary, the size of the optical device may be reduced by configuring the first lens L1 and the second lens L2 as small-diameter lenses with a small effective diameter, and the fifth lens L5 may be configured as a lens with a relatively large effective diameter as compared with the other lenses, corresponding to the image sensor IS to provide a high resolution. It is possible to effectively correct aberration by disposing the third lens L3 and the fourth lens L4 having a large refractive power and an effective diameter gradually increasing between the second lens L2 and the fifth lens L5.

As shown in FIG. 1, the first lens L1 may be a meniscus lens having a surface S2 convex to the object side O and a surface S3 convex to the image side I. Further, the surface S6 to the image side I of the second lens L2 may be convex. Further, the surface S10 to the image side I of the fourth lens L4 may be convex. According to an embodiment, the fifth lens L5 may be a meniscus lens to have the surface S12 concave to the image side I. The other parameters for the first lens L1, the second lens L2, the third lens L3, the fourth lens L4, and the fifth lens L5 than the ones described above in connection with the first lens L1, the second lens L2, the third lens L3, the fourth lens L4, and the fifth lens L5 may have various settings from an embodiment to another. However, this is merely an example for the first lens L1, the second lens L2, the third lens L3, the fourth lens L4, and the fifth lens L5, and it should be noted that application of other embodiments is also possible.

In the plurality of lenses (e.g., L1, L2, L3, L4, and L5) of the lens assembly 100, as the interval between two neighboring lenses reduces, the total length (the overall length of the lens assembly along the optical axis) of the lens assembly 100 may shorten. For example, upon attempting to make a more compact optical device and/or electronic device including the lens assembly 100 according to an embodiment of the disclosure, it may be more advantageous to keep the total length of the lens assembly 100 as short as possible. However, if an adequate telephoto ratio has been secured, reducing the overall length of the lens assembly 100 may be physically limited. According to an embodiment of the disclosure, the intervals between the plurality of lenses (e.g., L1, L2, L3, L4, and L5) may be varied depending on the optical properties (e.g., aberration, wide angle, and/or brightness properties) required for the lens assembly 100.

The lens assembly 100 may further include a filter F between the fifth lens L5 and the image sensor IS. The filter F may block off light, e.g., infrared (IR) light, detected by the image sensor or a film of the optical device. The filter F may include at least one of, e.g., a low pass filter or a cover glass. For example, the filter F may allow the color of an image detected and captured by the image sensor IS to be closer to the actual color which a human sees and feels for the object. The filter F may transmit visible light but reflect IR light so that IR light reaches the imaging plane img of the image sensor.

The above-described lens assembly 100 may be reduced in size and have high-performance optical properties by meeting the following conditional equation 1 and conditional equation 2.

$$0.2 < L1\ ape/\mathrm{Imag}H < 0.4 \qquad \text{[conditional equation 1]}$$

$$100 < FOV < 140 \qquad \text{[conditional equation 2]}$$

In conditional equation 1, 'L1 ape' may be half of the effective diameter (e.g., DS2 of FIG. 2) of the first lens L1, and 'ImagH' may be half of the diagonal length of the image sensor IS. In conditional equation 2, 'FOV' may be the field of view of the entire optical system including the lens assembly 100 and the image sensor IS. Conditional equation 1 may be an equation may be related to the effective diameter. For example, referring to FIG. 2, conditional equation 1 is an equation related to the effective diameter DS2 of the first lens L1 and may be a conditional equation for implementing an optical device advantageous to bezel-less implementation. When the characteristic of the optical system are larger than the upper limit of the conditional equation, e.g., 0.4, the effective diameter DS2 of the first lens L1 may be too large relative to the size of the image sensor IS. This can be disadvantageous in a bezel-less electronic device implementation. When smaller than the lower, e.g., 0.2, the effective diameter DS2 of the first lens L1 is too small relative to the size of the image sensor IS. This may render it difficult to secure relative illumination. Conditional equation 2 is an equation to define an ultra-wide angle optical system.

A bezel-less electronic device can include a smartphone. A smartphone is generally planar with a length, width, and preferably, a very low thickness dimension. Where the entire front surface of the electronic device is consumed by a display. As a result, the front facing camera (often referred to as a "selfie camera") may disposed under the display.

A FOV of 100 degrees or less may be not considered as an ultra-wide angle range. For a FOV of 140 degrees or more, an additional effective diameter of the first lens L1 may be too large for a bezel-less electronic device implementation.

The above-described lens assembly 100 may further meet conditional equation 3 below.

$$0.6<TTL/(ImagH\times2)<1.1 \quad \text{[conditional equation 3]}$$

Here, 'TTL' is the "optical total length" and may be the distance from the object-side (O) surface S1 of the lens barrel to the imaging surface img of the image sensor IS. Here, the object-side (O) surface S1 of the lens barrel may mean a point closest to the object side (O) in the lens barrel. Conditional equation 3 is an equation related to the slim factor which is making an electronic device, such as a smartphone, thin. When the characteristic of the optical system is larger than the upper limit of conditional equation 3, e.g., 1.1, it may be difficult to control the size and thickness of the electronic device. When smaller than the lower limit, e.g., 0.6, a desired field of view (for example, 100 degrees) is difficult to meet, or the lens is too thin to be processed, resulting in increased design difficulty.

The above-described lens assembly 100 may further meet conditional equation 4 below.

$$2.0<f/EPD<2.5 \quad \text{[conditional equation 4]}$$

Here, 'f' is the entire focal length of the entire optical system including the image sensor IS and the lens assembly 100, and 'EPD' may be the diameter of the entrance pupil of the entire optical system. Conditional equation 4 is an equation to define the F-number (Fno). When the characteristic of the optical system is larger than the upper limit, e.g., 2.5, of conditional equation 4, the F-number is excessively large so that the deflection limit is reduced to deteriorate the overall optical performance, leading to a dark optical system. In contrast, when the characteristic of the optical system is smaller than the lower limit, e.g., 2.0, of conditional equation 4, a bright optical system may be configured but, since more lenses are required to secure performance, the size of the optical device may increase.

The above-described lens assembly 100 may further meet conditional equation 5 below.

$$0.1<T1/TA<0.3 \quad \text{[conditional equation 5]}$$

Referring to FIGS. 1 and 2, 'T1' may be the distance from the surface S2 to the object side O of the first lens L1 to the aperture sto, and 'TA' may be the distance from the surface S2 to the object side O of the first lens L1 to the surface S12 to the image side of the fifth lens L5. The foregoing equation may be for implementing an optical device in a bezel-less electronic device.

FIG. 2 illustrates the first lens L1 as a meniscus lens convex to the object side O and concave to the image side I. FIG. 2 illustrates an embodiment in which the effective diameter DS2 of the object-side (O) surface S2 of the first lens L1 differs from the effective diameter DS3 of the image-side (I) surface S3, embodiments are not limited thereto, but the effective diameter DS2 of the object-side (O) surface S2 may be the same as the effective diameter DS3 of the image-side (I) surface S3. In the optical system including the first lens L1, over the upper limit of conditional equation 5, the incidence angle S20 of the light incident through the object-side (O) surface S2 of the first lens L1 is increased, causing an increase in the effective diameter DS2 of the object-side (O) surface S2 of the first lens L1 and resultantly disadvantage to bezel-less implementation. Below the lower limit of conditional equation 5, the sag value sag_S3 of the image-side (I) surface S3 of the first lens L1 is reduced, reducing the lens power, with the result of difficulty in implementing an ultra-wide angle. Here, sag (or sagitta) may denote the displacement of the curved surface drawn along the optical axis from the vertex of a surface (e.g., on the object side O) of a certain lens. FIG. 2 illustrates that the displacements of the object-side (O) surface S2 and image-side (I) surface S3 of the first lens L1 are sag_S2 and sag_S3, respectively. For example, sag may mean the distance in the optical axis direction from the vertex of the surface (e.g., object side O) of the lens and may be 'z' in conditional equation 9 below. In an embodiment, in the case of an aspheric lens, the change rate of the sag value may not be uniform. A larger sag value may render it difficult to process the lens but may be advantageous in correcting aberrations.

The above-described lens assembly 100 may further meet conditional equation 6 below.

$$25<L1S2 \; sag \; degree<55 \quad \text{[conditional equation 6]}$$

Referring to FIG. 2, here, 'L1S2 sag degree' may mean the sag angle S20 of the object-side (O) surface S2 of the first lens L1. Here, the 'sag angle' may mean an angle between the optical axis and an imaginary line drawn from the centripetal point P of a certain lens (e.g., the first lens L1) to the end portion of one surface of the lens. Conditional equation 6 may be a conditional equation for implementing an optical device advantageous in bezel-less implementation. When the characteristic of the optical system is over the upper limit of conditional equation 6, it is difficult to process and coat the lens, and reflection between the object-side (O) surface S2 and image-side (I) surface S3 of the first lens L1 and the flare between the first lens L1 and the window protecting the lens may worsen. Below the lower limit of conditional equation 6, the sag angle is reduced so that the optical total length TTL is increased due to securing the thickness of the barrel, and the power of the first lens L1 is increased, causing an increase in sensitivity.

The above-described lens assembly 100 may further meet conditional equation 7 below.

$$-50\%<distortion<-20\% \quad \text{[conditional equation 7]}$$

Here, 'distortion (or distortion value)' is (Y stereographic−Y ref)/Y ref*100, where Y stereographic is a function when the processor corrects the distortion value by applying the stereographic distortion mapping distortion function and may be y=2f·tan θ/2, and Y ref is the reference value when the processor does not apply the function and may be calculated as yref=f·tan θ. For example, when the FOV is 100, the distortion may have a value of −21.7%±0.5% and, when the FOV is 120, the distortion may have a value of −33.3%±0.5%. Further, when the FOV is 140, the distortion may have a value of −49%±0.5%. When the lens assembly 100 has a distortion value below the lower limit, e.g., −50% of conditional equation 7, the entire focal length f of the lens assembly to meet a desired field of view is reduced, and the effective diameter of the lens assembly 100 is increased. This makes it difficult to to use in a bezel-less electronic device. Distortion exceeding the upper limit, e.g., −20%, of conditional equation 7, the distortion is significantly increased, making it difficult to correct the distortion.

An embodiment of the disclosure advantageous for autoframing are described below with reference to FIGS. 3A to 3C.

Figure 3A:
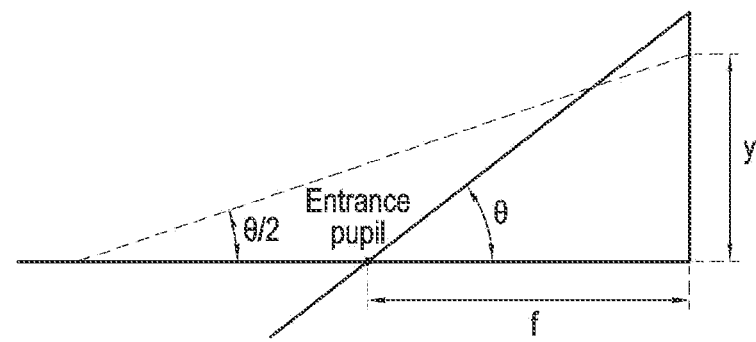
FIG. 3A is a view illustrating a stereographic distortion mapping function according to an embodiment.

FIG. 3A is a view illustrating a stereographic distortion mapping function according to an embodiment. FIG. 3B is a view illustrating an orthographic distortion mapping function according to an embodiment. FIG. 3C is a view illustrating an imaging area upon autoframing according to an embodiment.

According to an embodiment of the disclosure, upon autoframing, a stereographic distortion mapping function may be used.

Referring to FIG. 3A, the stereographic distortion mapping function may be $$y = 2f \cdot \tan\frac{\theta}{2},$$

where y may denote the image height, f the entire focal length, and θ the incidence angle of light with respect to the optical axis.

In general, in the case of an ultra-wide lens, the field of view expressed per unit pixel in the marginal portion may be narrowed as compared with the chief portion of the lens. That is, the center of the image appears larger and the edges appear smaller. Accordingly, autoframing on the marginal portion of the lens needs to use more pixels than on the chief portion when expressing the same field of view. For example, in some embodiments, the field of view expressed per unit pixel in the marginal portion may be about a half of that in the chief portion. Thus, in an embodiment of the disclosure, the field of view expressed per unit pixel in the marginal portion may be set to be similar to the field of view per unit pixel in the chief portion by using the stereographic distortion mapping function, thereby providing an advantage in autoframing. When the stereographic distortion mapping function is used upon autoframing, distortion may meet. conditional equation 7 above.

Figure 3B:
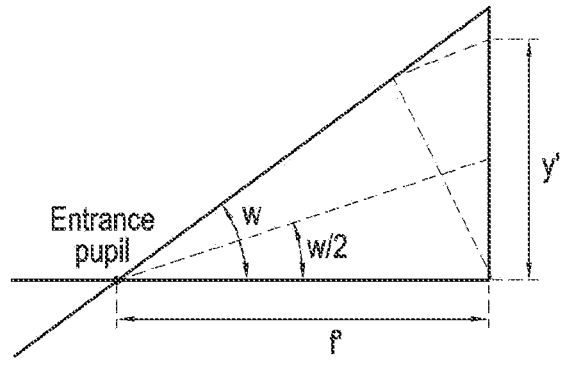
FIG. 3B is a view illustrating an orthographic distortion mapping function according to an embodiment.

FIG. 3B illustrates an orthographic distortion mapping function as a comparative example to FIG. 3A. Orthographic distortion mapping may be $$y' = 2f' \cdot \sin\frac{w}{2},$$

where y' may denote the image height, f the entire focal length, and w the incidence angle of light with respect to the optical axis. Referring to FIG. 3A, with reference to FIG. 3B, the stereographic distortion mapping function advantageously secures a wide vertical field of view as compared with that secured by the orthographic distortion mapping function which is another distortion mapping function, when the same light incidence angle with respect to the optical axis applies.

According to an embodiment of the disclosure, use of the stereographic distortion mapping function may implement autoframing with a broader imaging area secured. That is, an electronic device can include a processor that applies a stereographic distortion mapping function to the image of the image sensor.

Figure 3C:
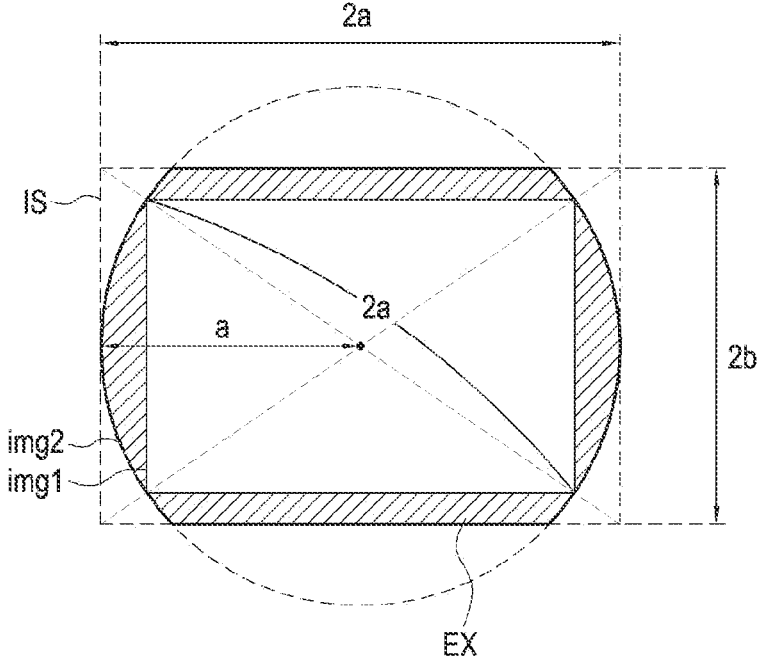
FIG. 3C is a view illustrating an imaging area upon autoframing according to an embodiment.

Referring to FIG. 3C, in a case where the image sensor obtains an image, e.g., when the image is cropped in a 4:2 ratio, the image may be output using the pixels in the imaging area img1 having a diagonal length of 2a in the image sensor IS having a long side of 2a and a short side of 2b. In contrast, according to an embodiment of the disclosure, a circular imaging area img2 having the distance from the center of the sensor to the long side as its diameter may be cropped from the image. The imaging area secured may be increased by the additional area EX shown in FIG. 3C as compared with the imaging area img1 according to another cropping method. The foregoing allows a broader wide angle image to be secured.

The above-described lens assembly 100 may further meet conditional equation 8 below.

$$nd5 > 1.6 \qquad \text{[conditional equation 8]}$$

Here, 'nd5' may mean the refractive index of the fifth lens L5. Conditional equation 8 is an equation regarding the refractive index of the fifth lens L5 and, as the fifth lens L5 may be formed of a high-refractive and low-dispersion material, the refractive index meeting conditional equation 8 is met, so that the chief ray angle (CRA) of light may be reduced, and chromatic aberration correction can be achieved.

Table 1 below shows various data about the lens assembly 100, wherein 'S2 to S3, S5 to S12' may denote the object-side (O) and image-side (I) surfaces of a plurality of relevant lenses (e.g., L1, L2, L3, L4, and L5). In Table 1, 'sto' may denote the aperture of the lens assembly 100, and 'S13' and 'S14' may mean the object-side (O) surface and image-side (I) surface of the infrared (IR) cut filter F. 'obj' may mean the object. In Table 1, 'S1' is not an actual lens surface, but a position considered in view of design of the lens assembly 400, e.g., a reference position of a structure in which a protection window is disposed or the position of a structure (or lens barrel or lens housing) for fixing any one (e.g., first lens L1) among the lenses (L1, L2, L3, L4, and L5). Further, radius may mean the radius of curvature of the lens, thickness the thickness of the lens or air gap, nd the refractive index of the medium (e.g., lens), and vd the Abbe's number of the lens. The lens assembly 100 included in Table 1 below may meet the above-described conditions (and/or at least one of the above-described conditions) when the F-number (Fno) is about 2.4, the angle of view (ANG) is about 120 degrees, and the entire focal length f (or entire focusing length (efl)) is about 1.73 mm, while the image height (ImgH) of the image sensor IS is 2.00.

TABLE 1

| surface | radius | thickness | nd | Vd |
|---|---|---|---|---|
| obj | infinity | 400 | | |
| S1 | infinity | 0.25 | | |
| S2 | 2.169 | 0.211 | 1.54401 | 55.91 |
| S3 | 0.926 | 0.22 | | |
| sto | infinity | 0 | | |
| S5 | 8.08 | 0.609 | 1.535 | 55.75 |
| S6 | −1.307 | 0.02 | | |
| S7 | 13.714 | 0.21 | 1.67074 | 19.23 |
| S8 | 2.986 | 0.1 | | |
| S9 | −63.332 | 0.735 | 1.535 | 55.75 |
| S10 | −0.712 | 0.222 | | |
| S11 | 2.3 | 0.48 | 1.63491 | 23.97 |
| S12 | 0.738 | 0.283 | | |
| S13 | infinity | 0.21 | 1.5168 | 64.2 |
| S14 | infinity | 0.595 | | |
| img | infinity | 0.025 | | |

13

Tables 2 and 3 below show the aspheric coefficients of the plurality of lenses (e.g., L1, L2, L3, L4, and L5), which may be calculated by conditional equation 9 as follows:

$$z = \frac{c'y^2}{1+\sqrt{1-(k+1)c'^2y^2}} + Ay^4 + By^6 + Cy^8 + Dy^{10} + Ey^{12} +$$
$$Fy^{14} + Gy^{16} + Hy^{18} + Jy^{20} + Ky^{22} + Ly^{24} + My^{26} + Ny^{28} + Oy^{30}$$

[conditional equation 9]

Here, 'z' may mean the distance sag from the vertex of the lens to the optical axis O-I, 'c' the reciprocal (1/R) of the default radius of curvature of the lens, 'y' the distance in the direction perpendicular to the optical axis, 'K' the Conic constant, and 'A', 'B', 'C', 'D', 'E', 'F', 'G', 'H', 'I', 'J', 'K(22$^{th}$)', 'L', 'M', 'N', 'O' the aspheric coefficients. In the numerical values of Table 2 below, 'E and the following number' may denote a power of 10. For example, E+01 may be $10^1$, and E-02 may be $10^{-2}$.

TABLE 2

|  | S2 | S3 | S4 | S6 | S7 |
|---|---|---|---|---|---|
| Radius | 2.16896E+00 | 9.25886E−01 | 8.08031E+00 | −1.30746E+00 | 1.37139E+01 |
| K | 0.00000E+00 | −3.37692E+01 | 0.00000E+00 | 1.86313E+00 | 0.00000E+00 |
| A(4$^{th}$) | 4.96198E−01 | 8.41370E+00 | −1.21448E−01 | −1.17994E+00 | −1.67448E+00 |
| B(6$^{th}$) | −2.96414E−04 | −3.61766E+02 | −3.67024E−01 | 8.44717E+00 | 3.74690E+01 |
| C(8$^{th}$) | −5.40598E+00 | 2.21848E+04 | 1.93527E−01 | −5.95471E+01 | −9.36613E+02 |
| D(10$^{th}$) | 5.41035E+01 | −9.87180E+05 | −4.89543E−02 | 2.45615E+02 | 1.70702E+04 |
| E(12$^{th}$) | −2.62042E+02 | 3.01162E+07 | 7.09171E−03 | −5.46756E+02 | −2.17325E+05 |
| F(14$^{th}$) | 7.55219E+02 | −6.40227E+08 | −5.97723E−04 | 4.80777E+02 | 1.94715E+06 |
| G(16$^{th}$)/ | −1.36357E+03 | 9.67442E+09 | 2.61405E−05 | 0.00000E+00 | −1.24748E+07 |
| H(18$^{th}$) | 1.60561E+03 | −1.05119E+11 | 1.50365E−06 | 0.00000E+00 | 5.78042E+07 |
| J(20$^{th}$) | −1.26691E+03 | 8.22376E+11 | 0.00000E+00 | 0.00000E+00 | −1.94141E+08 |
| K(22$^{th}$) | 6.76288E+02 | −4.58374E+12 | 0.00000E+00 | 0.00000E+00 | 4.68031E+08 |
| L(24$^{th}$) | −2.41396E+02 | 1.77280E+13 | 0.00000E+00 | 0.00000E+00 | −7.89188E+08 |
| M(26$^{th}$) | 5.52531E+01 | −4.51391E+13 | 0.00000E+00 | 0.00000E+00 | 8.83292E+08 |
| N(28$^{th}$) | −7.33599E+00 | 6.79394E+13 | 0.00000E+00 | 0.00000E+00 | −5.89238E+08 |
| O(30$^{th}$) | 4.28138E−01 | −4.57270E+13 | 0.00000E+00 | 0.00000E+00 | 1.77217E+08 |

TABLE 3

|  | S8 | S9 | S10 | S11 | S12 |
|---|---|---|---|---|---|
| Radius | 2.98630E+00 | −6.33316E+01 | −7.12185E−01 | 2.30031E+00 | 7.37949E−01 |
| K | −3.05546E+00 | 0.00000E+00 | −1.25091E+00 | −6.14859E+01 | −5.55083E+00 |
| A(4$^{th}$) | −7.12760E−01 | −3.01413E−03 | −1.39776E−02 | −1.45524E−01 | −9.69935E−02 |
| B(6$^{th}$) | 1.67091E+01 | 1.96279E+00 | 1.61533E+00 | 7.89815E−01 | 3.51095E−02 |
| C(8$^{th}$) | −2.59832E+02 | 3.24220E+00 | −1.08812E+01 | −3.97716E+00 | −2.40643E−02 |
| D(10$^{th}$) | 2.61629E+03 | −2.09530E+02 | 5.88717E+01 | 1.10676E+01 | 1.64928E−02 |
| E(12$^{th}$) | −1.81562E+04 | 1.80717E+03 | −3.32814E+02 | −2.00723E+01 | −7.15370E−03 |
| F(14$^{th}$) | 8.89102E+04 | −8.68363E+03 | 1.67157E+03 | 2.47087E+01 | 1.83389E−03 |
| G(16$^{th}$) | −3.11968E+05 | 2.73720E+04 | −6.20454E+03 | −2.10342E+01 | −2.97477E−04 |
| H(18$^{th}$) | 7.91643E+05 | −6.03744E+04 | 1.60201E+04 | 1.25404E+01 | 3.21661E−05 |
| J(20$^{th}$) | −1.45365E+06 | 9.76142E+04 | −2.84813E+04 | −5.26326E+00 | −2.38194E−06 |
| K(22$^{th}$) | 1.91061E+06 | −1.20370E+05 | 3.46221E+04 | 1.54612E+00 | 1.21511E−07 |
| L(24$^{th}$) | −1.74986E+06 | 1.14793E+05 | −2.81799E+04 | −3.11005E−01 | −4.20637E−09 |
| M(26$^{th}$) | 1.05898E+06 | −8.07596E+04 | 1.46415E+04 | 4.08012E−02 | 9.50375E−11 |
| N(28$^{th}$) | −3.80005E+05 | 3.65189E+04 | −4.37853E+03 | −3.14464E−03 | −1.36018E−12 |
| O(30$^{th}$) | 6.11320E+04 | −7.72021E+03 | 5.72238E+02 | 1.07988E−04 | 1.58542E−14 |

Figure 4:
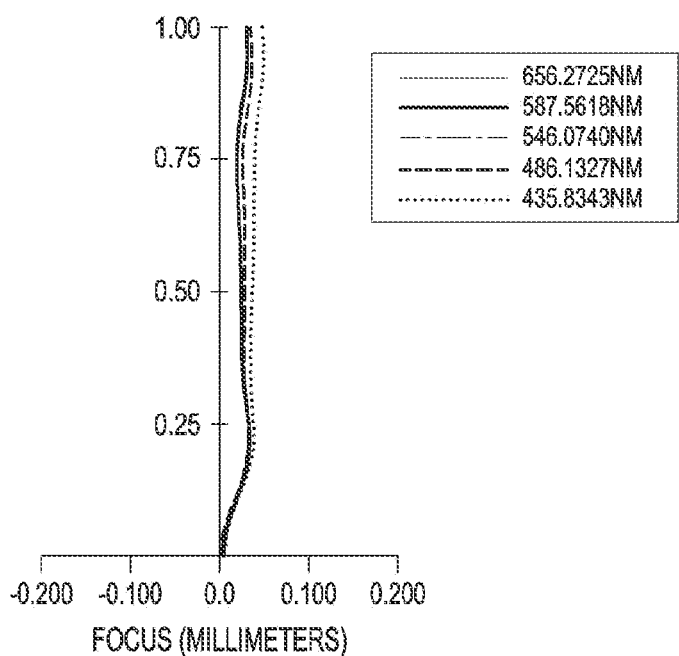
FIG. 4 is a graph illustrating the spherical aberration of a lens assembly according to the embodiment of FIG. 1.

FIG. 4 is a graph illustrating the spherical aberration of the lens assembly 100 according to one embodiment (e.g., the embodiment of FIG. 1) of an embodiment of the disclosure. Spherical aberration may refer to the phenomenon that light beams passing through different portions (e.g., the chief portion and the marginal portion) of the lens are focused on different positions.

In FIG. 4, the horizontal axis refers to the degree of longitudinal spherical aberration, and the vertical axis refers to the result of normalization of the distance from the center of the optical axis. FIG. 2 may illustrate variations in longitudinal spherical aberration depending on light wavelengths. The longitudinal spherical aberration may be shown for each of light beams whose wavelengths are about 656.2725 nanometers (nm), about 587.5618 nm, about 546.0740 nm, about 486.1327 nm, and about 435.8343 nm. Referring to FIG. 4, in a visible light range, the longitudinal spherical aberration of the lens assembly, according to an embodiment, may be limited to be within a range from about +0.050 to −0.050 so that stable optical properties are shown.

Figure 5:
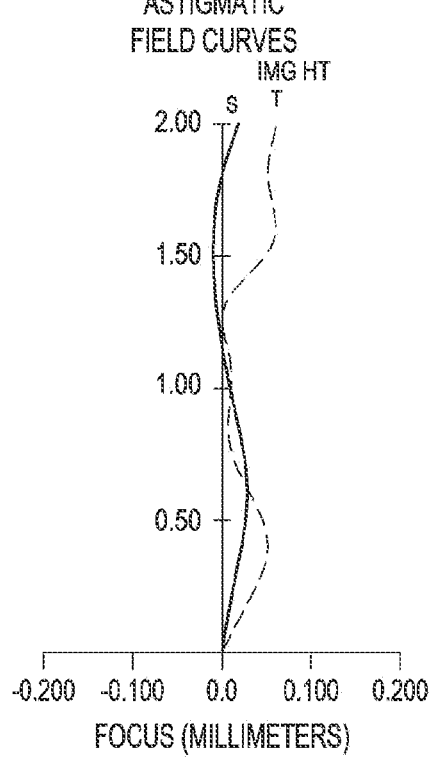
FIG. 5 is a graph illustrating the astigmatism of a lens assembly according to the embodiment of FIG. 1.

FIG. 5 is a graph illustrating the astigmatism of the lens assembly 100 according to one embodiment (e.g., the embodiment of FIG. 1) of an embodiment of the disclosure. Astigmatism may refer to a deviation between the focuses of the light beams passing in the vertical and horizontal directions when the tangential plane or meridian plane of the lens has a different radius from the radius of the sagittal plane of the lens.

FIG. 5 shows the results of astigmatism of the lens assembly 100 when are obtained in a wavelength of about 546.0740 nm, wherein the dashed line may denote the astigmatism in the tangential direction (e.g., tangential field curvature), and the solid line may denote the astigmatism in the sagittal direction (e.g., sagittal field curvature). It can be identified from FIG. 5 that the astigmatism may be limited to a range from about +0.050 to −0.050 so that stable optical properties may be shown according to an embodiment of the disclosure.

Figure 6:
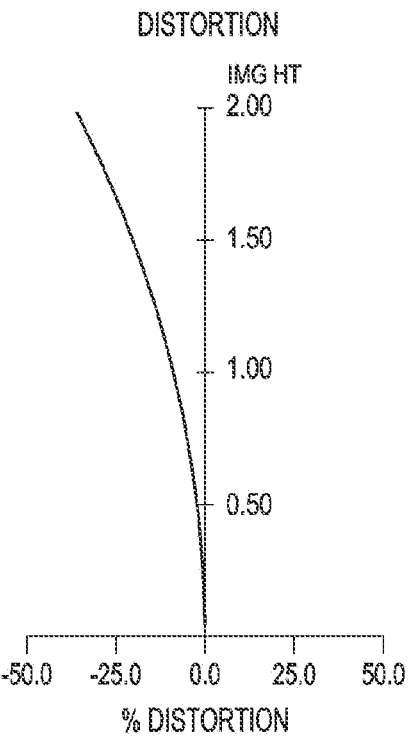
FIG. 6 is a graph illustrating the distortion of a lens assembly according to the embodiment of FIG. 1.

FIG. 6 is a graph illustrating the distortion of the lens assembly 100 according to one embodiment (e.g., the embodiment of FIG. 1) of an embodiment of the disclosure. Distortion occurs because the optical magnification varies depending on the distance from the optical axis O-I. As compared with an image forming on a theoretical imaging plane, an image forming on the actual imaging plane (e.g., the imaging plane img of FIG. 1) may be shown to be larger or smaller by distortion.

FIG. 6 shows the results of distortion of the lens assembly 100, which are obtained in a wavelength of about 546.0740 nm. The image captured by the lens assembly 100 may cause distortion at a point (e.g., marginal portion) off the optical axis O-I. In this case, the distortion may meet the range of −50%<distortion<−20%, as described above with respect to conditional equation 7. According to an embodiment of the disclosure, upon autoframing, a stereographic distortion mapping function may be used. As the stereographic distortion mapping function is used, the information obtained by the light incident on the marginal portion is not significantly compressed, so that it may be easy to increase the marginal resolution upon ultra-wide angle autoframing.

However, some embodiments of the disclosure may include an optical system implemented to have a distortion value within ±2% in the entire field, as a distortion-free optical system.

Figure 7:
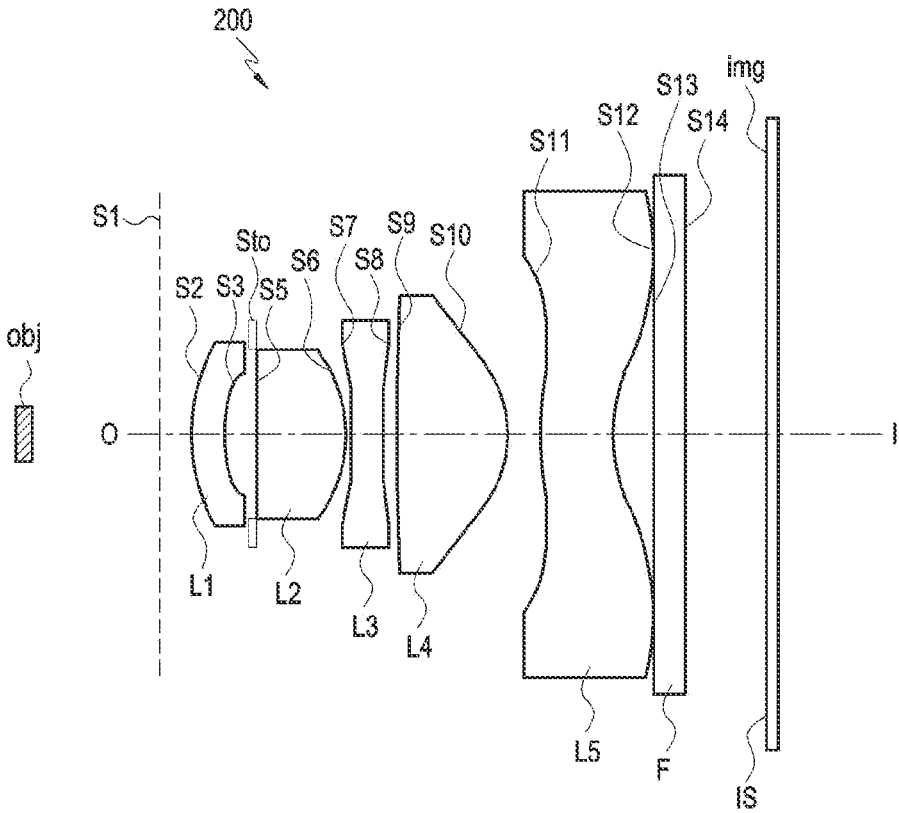
FIG. 7 is a view illustrating a configuration of an optical system including an image sensor and a lens assembly according to an embodiment.
Figure 8:
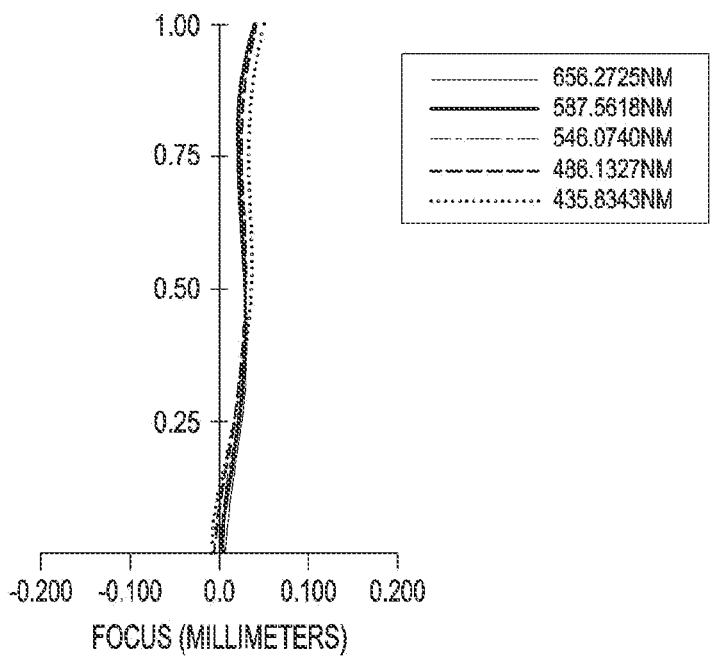
FIG. 8 is a graph illustrating the spherical aberration of a lens assembly according to the embodiment of FIG. 7.
Figure 9:
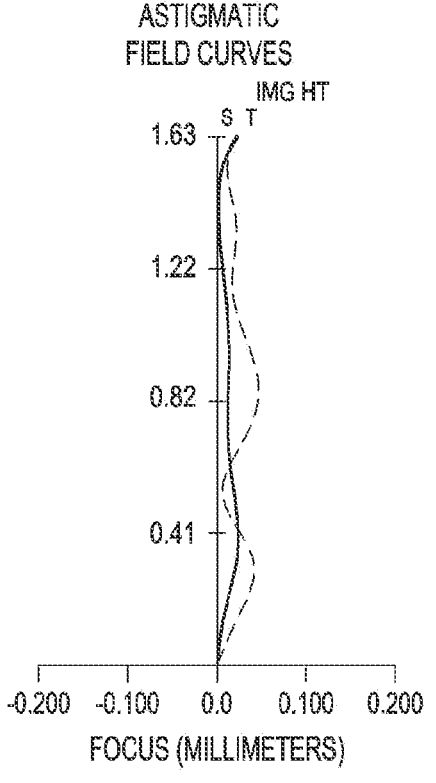
FIG. 9 is a graph illustrating the astigmatism of a lens assembly according to the embodiment of FIG. 7.
Figure 10:
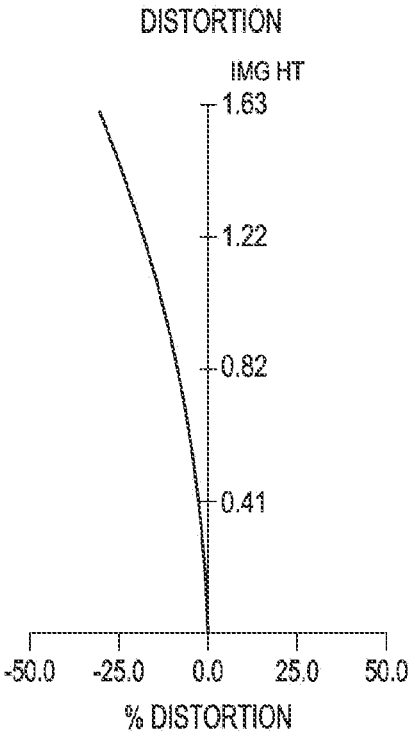
FIG. 10 is a graph illustrating the distortion of a lens assembly according to the embodiment of FIG. 7.

FIG. 7 is a view illustrating a configuration of a lens assembly 200 according to an embodiment. FIG. 8 is a graph illustrating the spherical aberration of a lens assembly 200 according to the embodiment of FIG. 7. FIG. 9 is a graph illustrating the astigmatism of a lens assembly 200 according to the embodiment of FIG. 7. FIG. 10 is a graph illustrating the distortion of a lens assembly 200 according to the embodiment of FIG. 7.

The description of the lens assembly 100 according to the foregoing embodiments may apply to lens assemblies 200 and 300 described below according to other an embodiment. Some of the plurality of lens assemblies 100, 200, and 300 may have the same lens attribute (e.g., view angle, focal length, auto-focusing, F-number (Fno), or optical zoom), or at least one lens assembly may have one or more lens attributes different from those of another lens assembly.

The plurality of lens assemblies 100, 200, and 300 may configure an optical device (e.g., a camera module) to include a flash (the flash 1620 of FIG. 22 as described below), an image sensor IS (e.g., the image sensor 1630 of FIG. 16), an image stabilizer (the image stabilizer 1640 of FIG. 16 as described below), a memory (the memory 1650 of FIG. 16 as described below), or an image signal processor (the image signal processor 1660 of FIG. 16 as described below).

In describing the following embodiments of the disclosure, the same or similar, or no reference characters are given for components which may readily be appreciated from the above-described embodiments. No detailed description thereof is presented below as long as it overlaps the above description.

Referring to FIGS. 7 to 10, according to an embodiment different from the embodiment of FIG. 1 of an embodiment of the disclosure, a lens assembly 200 may include a plurality of lenses (e.g., L1, L2, L3, L4, and L5), an image sensor IS, and/or a filter F.

Table 4 below may represent various lens data about the lens assembly 200 according to the embodiment of FIG. 7. Tables 5 and 6 below may show the aspheric coefficients of the plurality of lenses (e.g., L1, L2, L3, L4, and L5). The lens assembly 200 may have a F-number (Fno) of about 2.4, a view angle (ANG) of about 120 degrees, and an entire focal length f of about 1.41 mm and may meet the above-described conditions (and/or at least one of the above-described conditions).

TABLE 4

| Surface | radius | thickness | nd | Vd |
|---|---|---|---|---|
| Obj | infinity | 400 | | |
| S1 | infinity | 0.25 | | |
| S2 | 1.635 | 0.211 | 1.54401 | 55.91 |
| S3 | 0.703 | 0.215 | | |
| Sto | infinity | 0 | | |
| S5 | 17.475 | 0.516 | 1.535 | 55.75 |
| S6 | −0.806 | 0.02 | | |
| S7 | 6.707 | 0.21 | 1.67074 | 19.23 |
| S8 | 1.586 | 0.1 | | |
| S9 | −18.739 | 0.68 | 1.535 | 55.75 |
| S10 | −0.916 | 0.036 | | |
| S11 | 0.834 | 0.428 | 1.63491 | 23.97 |
| S12 | 0.569 | 0.223 | | |
| S13 | infinity | 0.21 | 1.5168 | 64.2 |
| S14 | infinity | 0.595 | | |
| Img | infinity | 0.025 | | |

TABLE 5

| | S2 | S3 | S4 | S6 | S7 |
|---|---|---|---|---|---|
| Radius | 1.63484E+00 | 7.03078E−01 | 1.74748E+01 | −8.06200E−01 | 6.70674E+00 |
| K | 0.00000E+00 | −1.95763E+01 | 0.00000E+00 | 8.63300E−01 | 0.00000E+00 |
| A($4^{th}$) | 3.20638E−01 | 8.85591E+00 | −2.83311E−01 | −8.28286E−01 | −1.43184E+00 |
| B($6^{th}$) | 8.53630E+00 | −2.27331E+02 | 7.64674E+00 | 1.46120E+01 | 9.09289E+00 |
| C($8^{th}$) | −1.73478E+02 | 1.34052E+04 | −2.31394E+02 | −1.76863E+02 | −4.87281E+01 |
| D($10^{th}$) | 2.20622E+03 | −6.27907E+05 | 3.71205E+03 | 1.15333E+03 | 1.64215E+01 |
| E($12^{th}$) | −1.87169E+04 | 2.02700E+07 | −3.47188E+04 | −3.89974E+03 | 1.45382E+03 |
| F($14^{th}$) | 1.08845E+05 | −4.53030E+08 | 1.81809E+05 | 5.22683E+03 | −8.67185E+03 |
| G($16^{th}$) | −4.38911E+05 | 7.12557E+09 | −4.68066E+05 | 0.00000E+00 | 2.20418E+04 |
| H($18^{th}$) | 1.23384E+06 | −7.94645E+10 | 4.58040E+05 | 0.00000E+00 | −2.55397E+04 |
| J($20^{th}$) | −2.41845E+06 | 6.26904E+11 | 0.00000E+00 | 0.00000E+00 | 1.02294E+04 |
| K($22^{th}$) | 3.28097E+06 | −3.45353E+12 | 0.00000E+00 | 0.00000E+00 | 0.00000E+00 |
| L($24^{th}$) | −3.01590E+06 | 1.29248E+13 | 0.00000E+00 | 0.00000E+00 | 0.00000E+00 |
| M($26^{th}$) | 1.79193E+06 | −3.11900E+13 | 0.00000E+00 | 0.00000E+00 | 0.00000E+00 |
| N($28^{th}$) | −6.20992E+05 | 4.36445E+13 | 0.00000E+00 | 0.00000E+00 | 0.00000E+00 |
| O($30^{th}$) | 9.53410E+04 | −2.68499E+13 | 0.00000E+00 | 0.00000E+00 | 0.00000E+00 |

TABLE 6

| | S8 | S9 | S10 | S11 | S12 |
|---|---|---|---|---|---|
| Radius | 1.58590E+00 | −1.87388E+01 | −9.16032E−01 | 8.33787E−01 | 5.69410E−01 |
| K | 4.12531E+00 | 0.00000E+00 | −3.72602E−01 | −5.79883E+00 | −3.95586E+00 |
| A(4th) | −3.39844E−01 | 9.01977E−01 | −3.19405E+00 | −2.82440E+00 | −5.00106E−01 |
| B(6th) | −1.60295E+01 | −5.77684E+00 | 4.20618E+01 | 3.00993E+01 | 8.87883E−01 |
| C(8th) | 2.77318E+02 | 4.74194E+01 | −3.57870E+02 | −2.36719E+02 | −1.35855E+00 |
| D(10th) | −2.47266E+03 | −1.42698E+03 | 2.19101E+03 | 1.29482E+03 | 4.86642E−01 |
| E(12th) | 9.45941E+03 | 2.85069E+04 | −9.89484E+03 | −5.06436E+03 | 4.11756E+00 |
| F(14th) | 3.31056E+04 | −3.24631E+05 | 3.29306E+04 | 1.44123E+04 | −1.21567E+01 |
| G(16th) | −6.38677E+05 | 2.34370E+06 | −7.86882E+04 | −3.01005E+04 | 1.77605E+01 |
| H(18th) | 3.95283E+06 | −1.14113E+07 | 1.25647E+05 | 4.61558E+04 | −1.56867E+01 |
| J(20th) | −1.43867E+07 | 3.85307E+07 | −1.05488E+05 | −5.15730E+04 | 8.65392E+00 |
| K(22th) | 3.36074E+07 | −9.06329E+07 | −3.06853E+04 | 4.12923E+04 | −2.87420E+00 |
| L(24th) | −5.03218E+07 | 1.45994E+08 | 1.97315E+05 | −2.29780E+04 | 4.84643E−01 |
| M(26th) | 4.55295E+07 | −1.53743E+08 | −2.33061E+05 | 8.41036E+03 | −4.73340E−03 |
| N(28th) | −2.13539E+07 | 9.54469E+07 | 1.28469E+05 | −1.81542E+03 | −1.12217E−02 |
| O(30th) | 3.29403E+06 | −2.65086E+07 | −2.84146E+04 | 1.74704E+02 | 1.22655E−03 |

Figure 11:
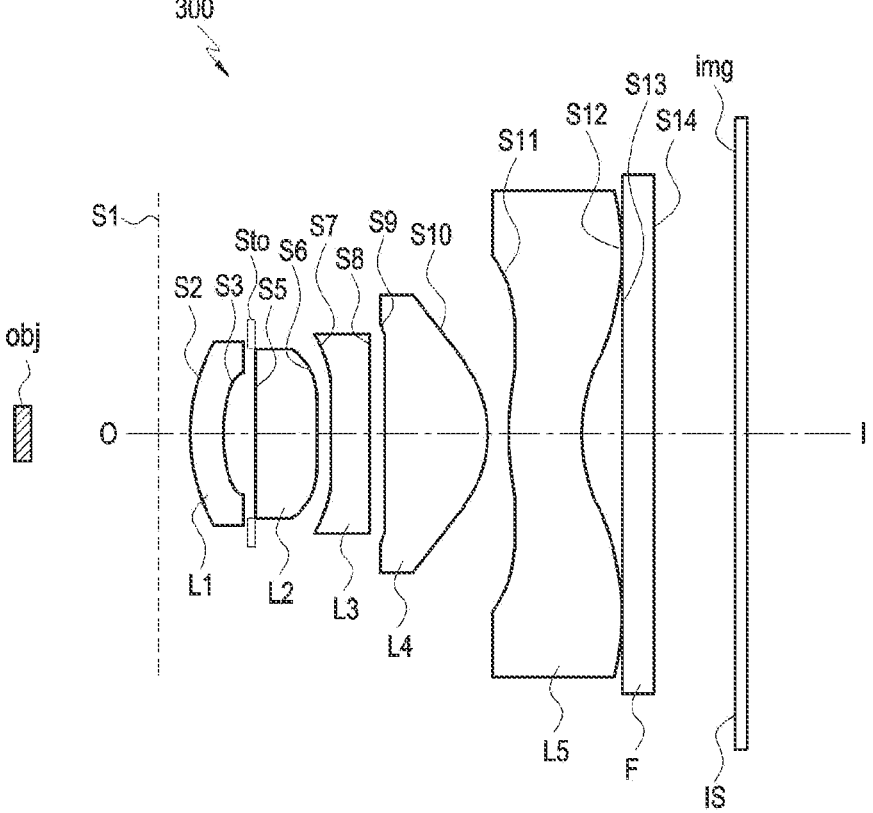
FIG. 11 is a view illustrating a configuration of an optical system including an image sensor and a lens assembly according to an embodiment.
Figure 12:
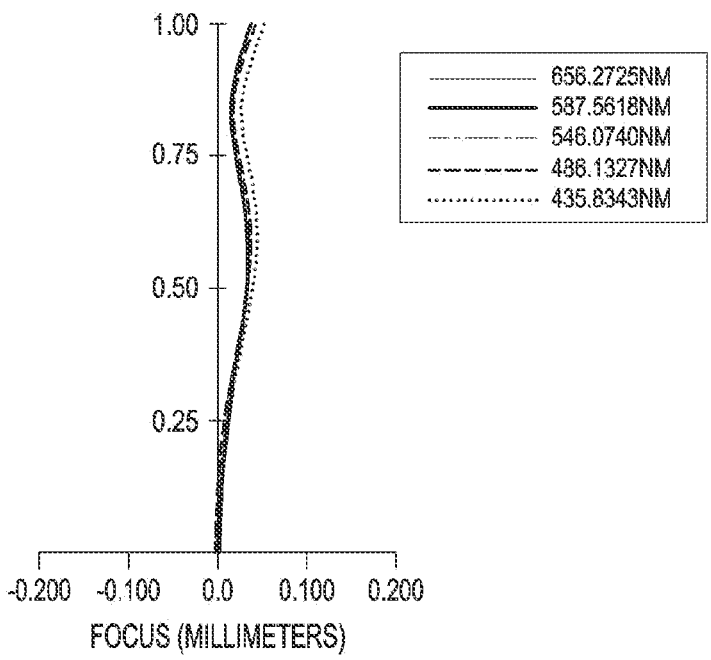
FIG. 12 is a graph illustrating the spherical aberration of a lens assembly according to the embodiment of FIG. 11.
Figure 13:
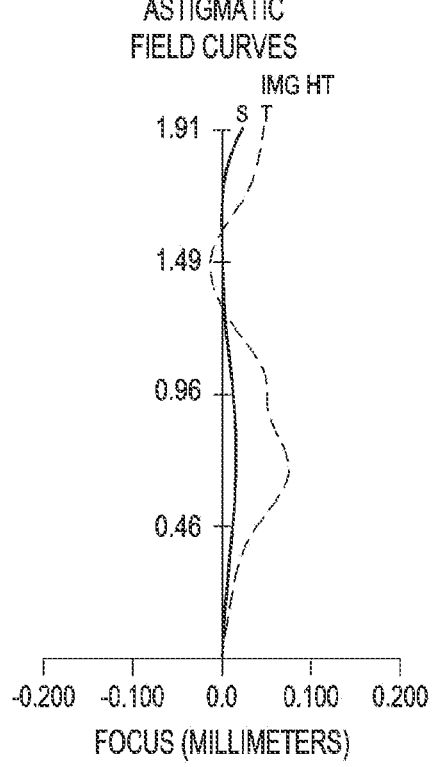
FIG. 13 is a graph illustrating the astigmatism of a lens assembly according to the embodiment of FIG. 11.
Figure 14:
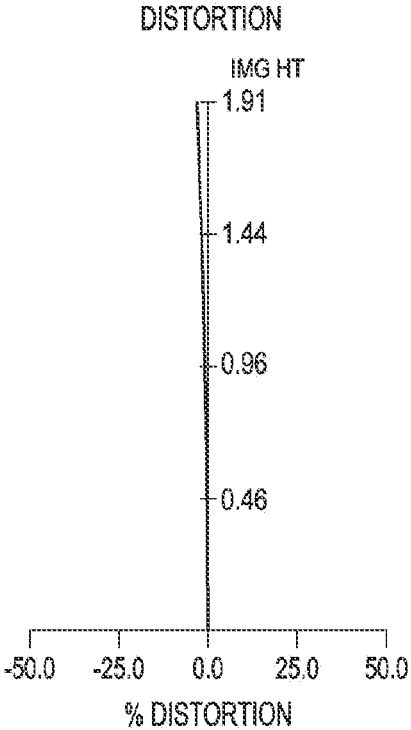
FIG. 14 is a graph illustrating the distortion of a lens assembly according to the embodiment of FIG. 11.

FIG. 11 is a view illustrating a configuration of a lens assembly 300 according to an embodiment. FIG. 12 is a graph illustrating the spherical aberration of a lens assembly 300 according to the embodiment of FIG. 11. FIG. 13 is a graph illustrating the astigmatism of a lens assembly 300 according to the embodiment of FIG. 11. FIG. 14 is a graph illustrating the distortion of a lens assembly 300 according to the embodiment of FIG. 11. Referring to FIG. 11, according to another embodiment of an embodiment of the disclosure, a lens assembly 300 may include a plurality of lenses (e.g., L1, L2, L3, L4, and L5), an image sensor IS, and/or a filter F.

Table 7 below may represent various lens data about the lens assembly 300 and Tables 8 and 9 below may show the respective aspheric coefficients of the plurality of lenses (L1, L2, L3, L4, and L5). The lens assembly 300 may have a F-number (Fno) of about 2.2, a view angle (ANG) of about 100 degrees, and an entire focal length of about 1.53 mm and may meet the above-described conditions (and/or at least one of the above-described conditions).

TABLE 7

| Surface | radius | thickness | nd | Vd |
|---|---|---|---|---|
| Obj | infinity | 400 | | |
| S1 | infinity | 0.35 | | |
| S2 | 1.945 | 0.2 | 1.54401 | 55.91 |
| S3 | 1.326 | 0.199 | | |
| Sto | infinity | 0 | | |
| S5 | 5.701 | 0.372 | 1.535 | 55.75 |
| S6 | −2.082 | 0.075 | | |
| S7 | infinity | 0.188 | 1.67074 | 19.23 |
| S8 | 3.458 | 0.082 | | |
| S9 | −4.374 | 0.68 | 1.535 | 55.75 |
| S10 | −0.515 | 0.093 | | |
| S11 | 1.063 | 0.293 | 1.63491 | 23.97 |
| S12 | 0.481 | 0.225 | | |
| S13 | infinity | 0.21 | 1.5168 | 64.2 |
| S14 | infinity | 0.595 | | |
| Img | infinity | 0.025 | | |

TABLE 8

| | S2 | S3 | S4 | S6 | S7 |
|---|---|---|---|---|---|
| Radius | 1.94468E+00 | 1.32585E+00 | 5.70137E+00 | −2.08181E+00 | −4.41630E+03 |
| K | 8.71183E+00 | 1.36663E+00 | 1.21213E+02 | 3.72283E+00 | 0.00000E+00 |
| A(4th) | 9.46708E−01 | 2.20114E+00 | −1.31638E−01 | −9.97756E−01 | −1.27199E+00 |
| B(6th) | −7.61440E−01 | −2.37124E+00 | 1.51332E+01 | 4.53322E+00 | −1.36097E+01 |
| C(8th) | 3.28085E+00 | 3.19733E+01 | −5.55183E+02 | −7.71577E+01 | 3.78140E+02 |
| D(10th) | 5.66973E+00 | 6.82988E+01 | 9.99916E+03 | 5.15345E+02 | −4.87664E+03 |
| E(12th) | −5.81982E+01 | −1.34935E+02 | −1.00906E+05 | −1.93659E+03 | 3.62572E+04 |
| F(14th) | 2.64505E+02 | 0.00000E+00 | 5.52360E+05 | 2.82060E+03 | −1.62323E+05 |
| G(16th) | −5.26020E+02 | 0.00000E+00 | −1.51008E+06 | 0.00000E+00 | 4.29761E+05 |
| H(18th) | 4.59310E+02 | 0.00000E+00 | 1.61061E+06 | 0.00000E+00 | −6.13842E+05 |
| J(20th) | −1.46797E+02 | 0.00000E+00 | 0.00000E+00 | 0.00000E+00 | 3.60738E+05 |
| K(22th) | 0.00000E+00 | 0.00000E+00 | 0.00000E+00 | 0.00000E+00 | 0.00000E+00 |
| L(24th) | 0.00000E+00 | 0.00000E+00 | 0.00000E+00 | 0.00000E+00 | 0.00000E+00 |
| M(26th) | 0.00000E+00 | 0.00000E+00 | 0.00000E+00 | 0.00000E+00 | 0.00000E+00 |
| N(28th) | 0.00000E+00 | 0.00000E+00 | 0.00000E+00 | 0.00000E+00 | 0.00000E+00 |
| O(30th) | 0.00000E+00 | 0.00000E+00 | 0.00000E+00 | 0.00000E+00 | 0.00000E+00 |

TABLE 9

| | S8 | S9 | S10 | S11 | S12 |
|---|---|---|---|---|---|
| Radius | 3.45810E+00 | −4.37431E+00 | −5.14896E−01 | 1.06325E+00 | 4.80704E−01 |
| K | 4.61266E+00 | 0.00000E+00 | −1.65489E+00 | −1.07470E+00 | −3.54366E+00 |
| A($4^{th}$) | 3.41178E−01 | 1.83372E+00 | 8.34281E−01 | 3.93058E−01 | −8.08764E−01 |
| B($6^{th}$) | −1.94190E+01 | −1.61433E+01 | −1.95386E+00 | −6.66384E+00 | 3.26975E+00 |
| C($8^{th}$) | 2.14027E+02 | 9.24831E+01 | −9.27188E+01 | 4.09862E+01 | −1.38190E+01 |
| D($10^{th}$) | −1.40513E+03 | −3.01096E+02 | 1.48595E+03 | −1.79407E+02 | 4.11246E+01 |
| E($12^{th}$) | 5.80303E+03 | 3.41470E+02 | −1.20332E+04 | 5.37080E+02 | −8.41765E+01 |
| F($14^{th}$) | −1.51743E+04 | 9.63331E+02 | 6.17688E+04 | −1.08696E+03 | 1.21887E+02 |
| G($16^{th}$) | 2.44267E+04 | −4.07599E+03 | −2.15808E+05 | 1.48976E+03 | −1.27878E+02 |
| H($18^{th}$) | −2.20401E+04 | 5.77276E+03 | 5.30027E+05 | −1.38045E+03 | 9.83589E+01 |
| J($20^{th}$) | 8.48858E+03 | −3.05240E+03 | −9.26019E+05 | 8.51034E+02 | −5.54313E+01 |
| K($22^{th}$) | 0.00000E+00 | 0.00000E+00 | 1.14520E+06 | −3.34170E+02 | 2.25908E+01 |
| L($24^{th}$) | 0.00000E+00 | 0.00000E+00 | −9.78750E+05 | 7.55617E+01 | −6.46859E+00 |
| M($26^{th}$) | 0.00000E+00 | 0.00000E+00 | 5.48641E+05 | −7.48054E+00 | 1.23224E+00 |
| N($28^{th}$) | 0.00000E+00 | 0.00000E+00 | −1.80904E+05 | 0.00000E+00 | −1.40021E−01 |
| O($30^{th}$) | 0.00000E+00 | 0.00000E+00 | 2.64818E+04 | 0.00000E+00 | 7.17300E−03 |

From the above-described embodiments, various data about lenses may be identified in the lens assemblies (e.g., 100, 200, and 300) and/or an electronic device including the lens assemblies (e.g., 100, 200, and 300). Such data may meet the above-described conditions, e.g., the results of conditional equations 1 to 8.

TABLE 10

| | Embodiment 1 | Embodiment 2 | Embodiment 3 |
|---|---|---|---|
| conditional equation 1 | 0.31 | 0.32 | 0.28 |
| conditional equation 2 | 120 | 120 | 100 |
| conditional equation 3 | 0.99 | 1.06 | 0.90 |
| conditional equation 4 | 2.4 | 2.4 | 2.2 |
| conditional equation 5 | 0.154 | 0.176 | 0.183 |
| conditional equation 6 | 37 | 34 | 46 |
| conditional equation 7 | met | met | — |
| conditional equation 8 | 1.635 | 1.635 | 1.635 |

In Table 10 above, 'embodiment 1,' 'embodiment 2,' and 'embodiment 3 may mean the lens assembly 100 of FIG. 1, the lens assembly 200 of FIG. 6, and the lens assembly 300 of FIG. 10, respectively.

The above-described lens assembly (e.g., 100, 200, and 300) may be equipped in an electronic device (e.g., an optical device). In addition to the image sensor IS, the electronic device (e.g., an optical device) may further include an application processor (AP) and drive an operating system (OS) or application programs through the application processor (AP) to thereby control multiple hardware or software components connected with the (AP) and to perform processing and computation on various data. For example, the application processor (AP) may further include a graphic processing unit (GPU) and/or an image signal processor. When the application processor (AP) includes an image signal processor, the image (or video) obtained by the image sensor IS may be stored or output by way of the application processor.

Figure 15:
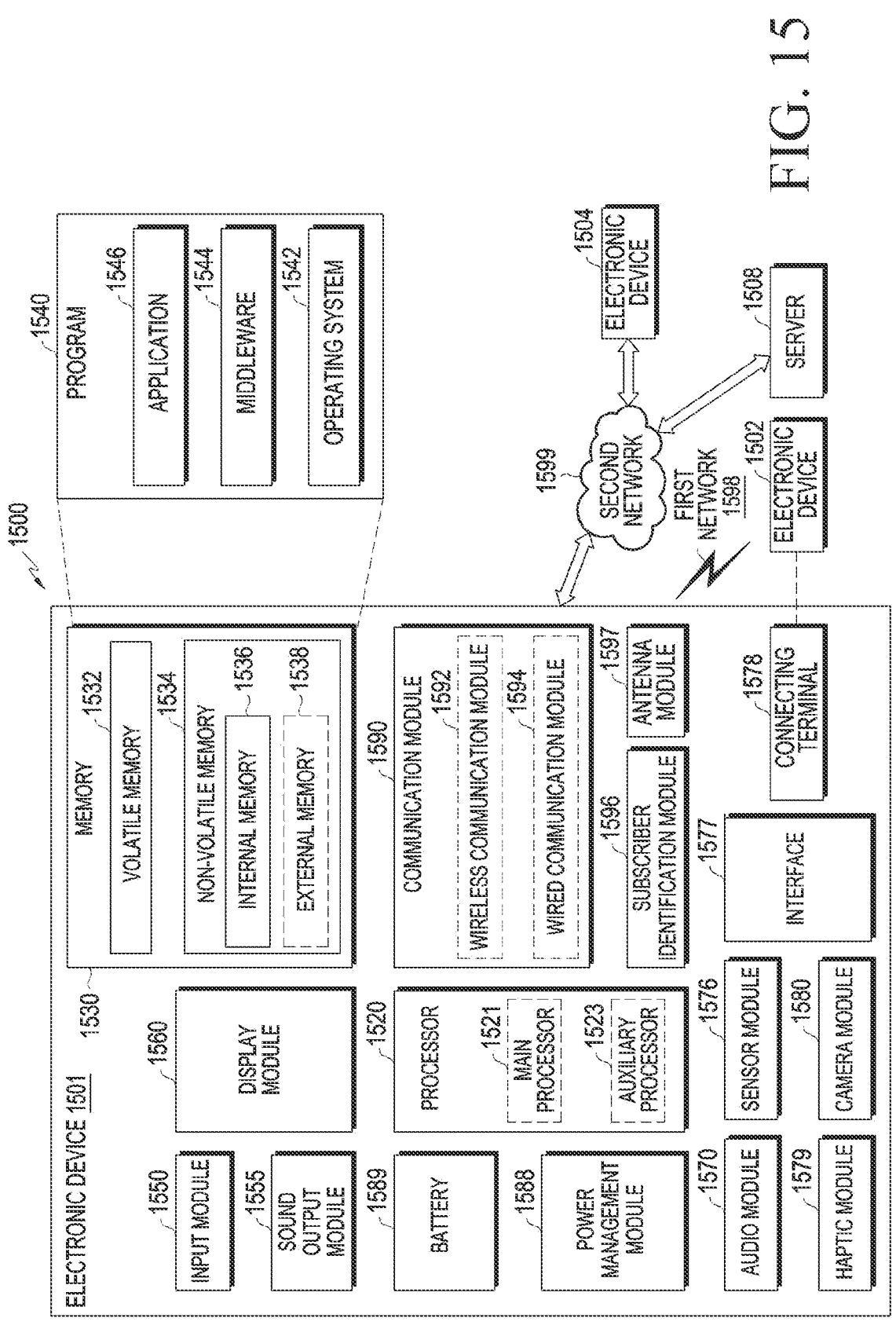
FIG. 15 is a block diagram illustrating an electronic device in a network environment according to an embodiment.

FIG. 15 is a block diagram illustrating an electronic device 1501 (e.g., an optical device) in a network environment 1500 according to an embodiment. Referring to FIG. 15, the electronic device 1501 (e.g., an optical device) in the network environment 1500 may communicate with at least one of an electronic device 1502 via a first network 1598 (e.g., a short-range wireless communication network), or an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input module 1550, a sound output module 1555, a display module 1560, an audio module 1570, a sensor module 1576, an interface 1577, a connecting terminal 1578, a haptic module 1579, a camera module 1580, a power management module 1588, a battery 1589, a communication module 1590, a subscriber identification module (SIM) 1596, or an antenna module 1597. In some embodiments, at least one (e.g., the display module 1560 or the camera module 1580) of the components may be omitted from the electronic device 1501, or one or more other components may be added in the electronic device 101. According to an embodiment, some (e.g., the sensor module 1576, the camera module 1580, or the antenna module 1597) of the components may be integrated into a single component (e.g., the display module 1560).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may store a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), or an auxiliary processor 1523 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 1501 includes the main processor 1521 and the auxiliary processor 1523, the auxiliary processor 1523 may be configured to use lower power than the main processor 1521 or to be specified for a designated function. The auxiliary processor 1523 may be implemented as separate from, or as part of the main processor 1521.

The term "processor" shall be understood to refer to both the singular and plural contexts in this disclosure.

The auxiliary processor 1523 may control at least some of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 123. According to an embodiment, the auxiliary processor 1523 (e.g., the neural processing unit) may include a hardware structure specified for artificial intelligence model processing. The artificial intelligence model may be generated via machine learning. Such learning may be performed, e.g., by the electronic device 1501 where the artificial intelligence is performed or via a separate server (e.g., the server 1508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input module 1550 may receive a command or data to be used by other component (e.g., the processor 1520) of the electronic device 1501, from the outside (e.g., a user) of the electronic device 1501. The input module 1550 may include, for example, a microphone, a mouse, a keyboard, keys (e.g., buttons), or a digital pen (e.g., a stylus pen).

The sound output module 1555 may output sound signals to the outside of the electronic device 1501. The sound output module 1555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1560 may visually provide information to the outside (e.g., a user) of the electronic device 1501. The display 1560 may include, for example, a display, a hologram device, or a projector and control circuitry to control a corresponding one of the display, hologram device, and projector. According to an embodiment, the display 1560 may include a touch sensor configured to detect a touch, or a pressure sensor configured to measure the intensity of a force generated by the touch.

The audio module 1570 may convert a sound into an electrical signal and vice versa. According to an embodiment, the audio module 1570 may obtain the sound via the input module 1550, or output the sound via the sound output module 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 101, and then generate an electrical signal or data value corresponding to the detected state. According to an embodiment, the sensor module 1576 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or motion) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 2192 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device 1504 via a first network 1598 (e.g., a short-range communication network, such as Bluetooth™, wireless-fidelity (Wi-Fi) direct, or infrared data association (IrDA)) or a second network 1599 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 1592 may identify or authenticate the electronic device 1501 in a communication network, such as the first network 1598 or the second network 1599, using subscriber information (e.g., international mobile subscriber identity (IMSI)) stored in the subscriber identification module 1596.

The wireless communication module 1592 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1592 may support a high-frequency band (e.g., the mmWave band) to achieve, e.g., a high data transmission rate. The wireless communication module 1592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1592 may support various requirements specified in the electronic device 1501, an external electronic device (e.g., the electronic device 1504), or a network system (e.g., the second network 1599). According to an embodiment, the wireless communication module 1592 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1597 may transmit or receive a signal or power to or from the outside (e.g., the external electronic device). According to an embodiment, the antenna module 1597 may include one antenna including a radiator formed of a conductor or conductive pattern formed on a substrate (e.g., a printed circuit board (PCB)). According to an embodiment, the antenna module 1597 may include a plurality of antennas (e.g., an antenna array). In this case, at least one antenna appropriate for a communication scheme used in a communication network, such as the first network 1598 or the second network 1599, may be selected from the plurality of antennas by, e.g., the communication module 1590. The signal or the power may then be transmitted or received between the communication module 1590 and the external electronic device via the selected at least one antenna. According to an embodiment, other parts (e.g., radio frequency integrated circuit (RFIC)) than the radiator may be further formed as part of the antenna module 1597.

According to an embodiment, the antenna module 1597 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. The external electronic devices 1502 and 1504 each may be a device of the same or a different type from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, mobile edge computing (MEC), or client-server computing technology may be used, for example.

The electronic device 1501 may provide ultra low-latency services using, e.g., distributed computing or mobile edge computing. In another embodiment, the external electronic device 1504 may include an Internet-of-things (IoT) device. The server 1508 may be an intelligent server using machine learning and/or a neural network. According to an embodiment, the external electronic device 1504 or the server 1508 may be included in the second network 1599. The electronic device 1501 may be applied to intelligent services (e.g., smart home, smart city, smart car, or health-care) based on 5G communication technology or IoT-related technology.

Figure 16:
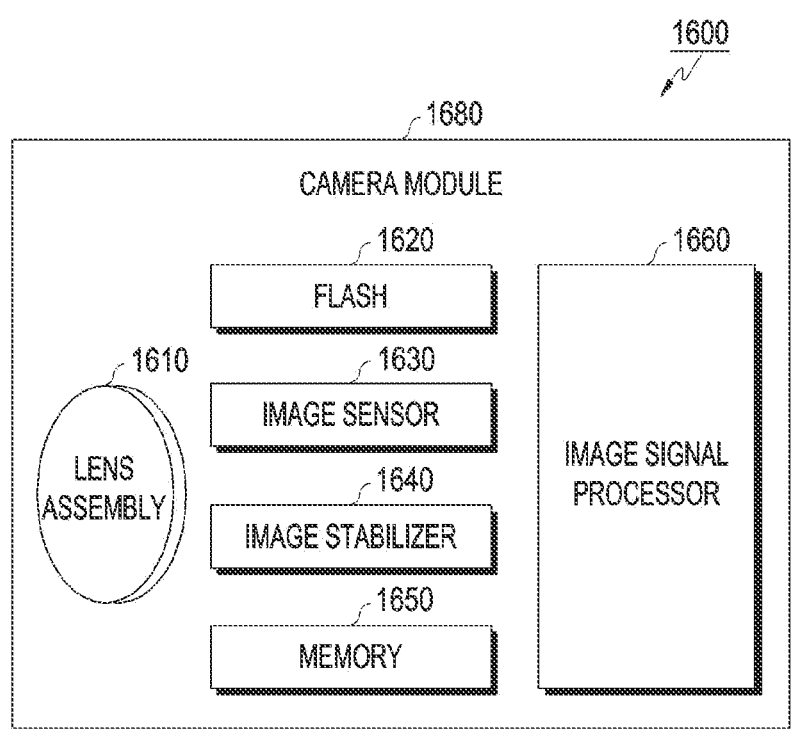
FIG. 16 is a block diagram illustrating an example of a camera module according to an embodiment.

FIG. 16 is a block diagram 1600 illustrating the camera module 1680 according to an embodiment. Referring to FIG. 16, the camera module 1680 may include a lens assembly 1610 (e.g., the lens assembly 100 of FIG. 1, the lens assembly 200 of FIG. 6, or the lens assembly 300 of FIG. 10), a flash 1620, an image sensor 1630 (e.g., the image sensor IS of FIGS. 1, 6, and 10), an image stabilizer 1640, a memory 1650 (e.g., a buffer memory) (e.g., the memory 1530 of FIG. 15), or an image signal processor 1660. The lens assembly 1610 may collect light emitted or reflected from an object whose image is to be taken. The lens assembly 1610 may include one or more lenses. According to an embodiment, the camera module 1680 may include a plurality of lens assemblies 1610. In such a case, the camera module 1680 may form, for example, a dual camera, a 360-degree camera, or a spherical camera. Some of the plurality of lens assemblies 1610 may have the same lens attribute (e.g., view angle, focal length, auto-focusing, F-number (Fno), or optical zoom), or at least one lens assembly may have one or more lens attributes different from those of another lens assembly. The lens assembly 1610 may include, for example, a wide-angle lens or a telephoto lens.

The flash 1620 may emit light that is used to reinforce light reflected from an object. According to an embodiment, the flash 1620 may include one or more light emitting diodes (LEDs) (e.g., a red-green-blue (RGB) LED, a white LED, an infrared (IR) LED, or an ultraviolet (UV) LED) or a xenon lamp. The image sensor 1630 may obtain an image corresponding to an object by converting light emitted or reflected from the object and transmitted via the lens assembly 1610 into an electrical signal. According to an embodiment, the image sensor 1630 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1630 may be implemented using, for example, a charged coupled device (CCD) sensor or a complementary metal oxide semiconductor (CMOS) sensor.

The image stabilizer 1640 may move the image sensor 1630 or at least one lens included in the lens assembly 1610 in a particular direction, or control an operational attribute (e.g., adjust the read-out timing) of the image sensor 1630 in response to the movement of the camera module 1680 or the electronic device 1501 including the camera module 180. This allows compensating for at least part of a negative effect (e.g., image blurring) by the movement on an image being captured. According to an embodiment, the image stabilizer 1640 may sense such a movement by the camera module 1680 or the electronic device 1501 using a gyro sensor (not shown) or an acceleration sensor (not shown) disposed inside or outside the camera module 1680. According to an embodiment, the image stabilizer 1640 may be implemented, for example, as an optical image stabilizer. The memory 1650 may store, at least temporarily, at least part of an image obtained via the image sensor 1630 for a subsequent image processing task. For example, if image capturing is delayed due to shutter lag or multiple images are quickly captured, a raw image obtained (e.g., a Bayer-patterned image, a high-resolution image) may be stored in the memory 1650, and its corresponding copy image (e.g., a low-resolution image) may be previewed via the display module 1560. Thereafter, if a specified condition is met (e.g., by a user's input or system command), at least part of the raw image stored in the memory 1650 may be obtained and processed, for example, by the image signal processor 1660. According to an embodiment, the memory 1650 may be configured as at least part of the memory 1630 or as a separate memory that is operated independently from the memory 130.

The image signal processor 1660 may perform one or more image processing with respect to an image obtained via the image sensor 1630 or an image stored in the memory 1650. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1660 may perform control (e.g., exposure time control or read-out timing control) with respect to at least one (e.g., the image sensor 1630) of the components included in the camera module 1680. An image processed by the image signal processor 1660 may be stored back in the memory 1650 for further processing, or may be provided to an external component (e.g., the memory 1530, the display module 1560, the electronic device 1502, the electronic device 1504, or the server 1508) outside the camera module 1680. According to an embodiment, the image signal processor 1660 may be configured as at least part of the processor 1520, or as a separate processor that is operated independently from the processor 1520. If the image signal processor 1660 is configured as a separate processor from the processor 1520, at least one image processed by the image signal processor 1660 may be displayed, by the processor 2320, via the display module 1660 as it is or after being further processed.

According to an embodiment, the electronic device 1501 may include a plurality of camera modules 1680 having different attributes or functions. In such a case, at least one of the plurality of camera modules 1680 may form, for example, a wide-angle camera and at least another of the plurality of camera modules 180 may form a telephoto camera. Similarly, at least one of the plurality of camera modules 1680 may form, for example, a front camera and at least another of the plurality of camera modules 180 may form a rear camera.

The electronic device according to an embodiment may be one of various types of devices. The electronic devices may include, for example, a portable communication device (e.g., a smart phone), a computer device, a portable multimedia device, a portable medical device, a camera, a wearable device, or a home appliance. According to an embodiment of the present invention, the electronic device is not limited to the above-listed embodiments.

It should be appreciated that an embodiment of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

According to an embodiment of the disclosure, there may be provided an electronic device (e.g., the electronic device 1501 of FIG. 15) comprising a lens assembly (e.g., the lens assemblies 100, 200, and 300 of FIGS. 1, 7, and 11) including a plurality of lenses aligned along an optical axis direction from an object side to an image side and wherein the plurality of lenses including a first lens (e.g., the first lenses L1 of FIGS. 1, 7, and 11) having a negative refractive power; a second lens (e.g., the second lenses L2 of FIGS. 1, 7, and 11) having a positive refractive power; a third lens (e.g., the third lenses L3 of FIGS. 1, 7, and 11); a fourth lens (e.g., the fourth lenses L4 of FIGS. 1, 7, and 11); and a fifth lens (e.g., the fifth lenses L5 of FIGS. 1, 7, and 11) having a negative refractive power; and an image sensor (e.g., the image sensors IS of FIGS. 1, 7, and 11) including an imaging plane, the image sensor configured to form an image; wherein the lens assembly satisfies conditional equation 1 and conditional equation 2.

$$0.2 < L1\ ape/\mathrm{Imag}H < 0.4 \qquad \text{[conditional equation 1]}$$

$$100 < FOV < 140 \qquad \text{[conditional equation 2]}$$

where in conditional equation 1, 'L1 ape' is half an effective diameter of the first lens, and 'ImagH' is half a diagonal length of the image sensor, and in conditional equation 2, 'FOV' is a field of view of an entire optical system including the lens assembly and the image sensor.

According to an embodiment, the third lens may have a negative refractive power.

According to an embodiment, the first lens may be convex on the object side.

According to an embodiment, the fifth lens may be convex on the object side.

According to an embodiment, the fifth lens may be aspheric to both the object side and the image side.

According to an embodiment, the fifth lens may include at least one inflection point.

According to an embodiment, the electronic device may meet conditional equation 3.

$$0.6 < TTL/(\mathrm{Imag}H \times 2) < 1.1$$

where 'TTL' is a distance from an object-side surface of a lens barrel to the imaging plane of the image sensor.

According to an embodiment, the electronic device may meet conditional equation 4.

$$2.0 < f/EPD < 2.5 \qquad \text{[conditional equation 4]}$$

where 'f' is an entire focal length of an entire optical system including the lens assembly and the image sensor, and 'EPD' is a diameter of an entrance pupil of the entire optical system.

According to an embodiment, an aperture (e.g., the apertures sto of FIGS. 1, 7, and 11) may be disposed between first lens and the second lens.

According to an embodiment, the electronic device may meet conditional equation 5.

$$0.1 < T1/TA < 0.3 \qquad \text{[conditional equation 5]}$$

where 'T1' is a distance from an object-side surface of the first lens to an aperture, and 'TA' is a distance from the object-side surface of the first lens to an image-side surface of the fifth lens.

According to an embodiment, the electronic device may meet conditional equation 6.

$$25 < L1S2\ sag\ \mathrm{degree} < 55 \qquad \text{[conditional equation 6]}$$

where 'L1S2 sag degree' is an angle in a sagittal direction of an object-side surface of the first lens.

According to an embodiment, the electronic device may include a processor (processor 1520) configured to apply a stereographic distortion mapping function to the image, thereby resulting in a corrected image, and a display (display module 1560) to output the corrected image.

According to an embodiment, a distortion of the lens assembly may meet conditional equation 7.

$$-50\% < distortion < -20\% \qquad \text{[conditional equation 7]}$$

According to an embodiment, the electronic device may meet conditional equation 8.

$$nd5 > 1.6 \qquad \text{[conditional equation 8]}$$

where 'nd5' is a refractive index of the fifth lens.

According to an embodiment, upon outputting an image by the image sensor, an image area corresponding to a circular shape having a distance from a center of the image sensor to a long side of the image sensor as a diameter may be cropped from the image.

According to an embodiment of the disclosure, there may be provided an electronic device (e.g., the electronic device 1501 of FIG. 15) comprising a lens assembly (e.g., the lens assemblies 100, 200, and 300 of FIGS. 1, 7, and 11) including a plurality of lenses aligned along an optical axis direction from an object side to an image side and wherein the plurality of lenses including a first lens (e.g., the first lenses L1 of FIGS. 1, 7, and 11) having a negative refractive power; a second lens (e.g., the second lenses L2 of FIGS. 1, 7, and 11) having a positive refractive power; a third lens (e.g., the third lenses L3 of FIGS. 1, 7, and 11); a fourth lens (e.g., the fourth lenses L4 of FIGS. 1, 7, and 11); and a fifth lens (e.g., the fifth lenses L5 of FIGS. 1, 7, and 11) having a negative refractive power; an image sensor (e.g., the image sensors IS of FIGS. 1, 7, and 11) including an imaging plane, the image sensor configured to form an image; and an aperture (e.g., the apertures sto of FIGS. 7 and 11) disposed between the first lens and the second lens; wherein an effective diameter of the first lens and the second lens are smaller than effective diameters of the third lens, the fourth lens, and the fifth lens, and wherein the lens assembly satisfies conditional equation 1 and conditional equation 2.

$$0.2 < L1\ ape/\text{Imag}H < 0.4 \qquad \text{[conditional equation 1]}$$

$$100 < FOV < 140 \qquad \text{[conditional equation 2]}$$

where in conditional equation 1, 'L1 ape' is half an effective diameter of the first lens, and 'ImagH' is half a diagonal length of the image sensor, and in conditional equation 2, 'FOV' is a field of view of an entire optical system including the lens assembly and the image sensor.

According to an embodiment, the electronic device may meet conditional equation 3 and conditional equation 4.

$$0.6 < TTL/(\text{Imag}H \times 2) < 1.1 \qquad \text{[conditional equation 3]}$$

$$2.0 < f/EPD < 2.5 \qquad \text{[conditional equation 4]}$$

where 'TTL' is a distance from an object-side surface of the lens barrel to the imaging plane of the image sensor, 'f' is an entire focal length of an entire optical system including the lens assembly and the image sensor, and 'EPD' is a diameter of an entrance pupil of the entire optical system.

According to an embodiment, the electronic device may meet conditional equation 5 and conditional equation 6.

$$0.1 < T1/TA < 0.3 \qquad \text{[conditional equation 5]}$$

$$25 < L1S2\ sag\ degree < 55 \qquad \text{[conditional equation 6]}$$

where 'T1' is a distance from an object-side surface of the first lens to the aperture, 'TA' is a distance from the object-side surface of the first lens to an image-side surface of the fifth lens, and 'L1S2 sag degree' is an angle of the object-side surface of the first lens in a sagittal direction.

According to an embodiment, a distortion of the lens assembly may meet conditional equation 7.

$$-50\% < distortion < -20\% \qquad \text{[conditional equation 7]}$$

According to an embodiment, the electronic device may meet conditional equation 8.

$$nd5 > 1.6 \qquad \text{[conditional equation 8]}$$

where 'nd5' is a refractive index of the fifth lens.

While the present invention has been shown and described with reference to exemplary embodiments thereof, it will be apparent to those of ordinary skill in the art that various changes in form and detail may be made thereto without departing from the spirit and scope of the present invention as defined by the following claims. For example, in specific embodiments of the disclosure, the measurements of the plurality of lenses may be properly set depending on the structure, specifications, or actual use environment of the lens assembly as actually manufactured or an electronic device equipped with the lens assembly.

What is claimed:

1. An electronic device comprising:
a lens assembly including a plurality of lenses aligned along an optical axis direction from an object side to an image side, wherein the plurality of lenses including,
a first lens having a negative refractive power;
a second lens having a positive refractive power;
a third lens;
a fourth lens; and
a fifth lens having a negative refractive power; and
an image sensor including an imaging plane, the image sensor configured to form an image;
a processor to apply a stereographic distortion mapping function to the image, thereby resulting in a corrected image, and
a display to output the corrected image,
wherein the lens assembly satisfies formula 1, formula 2, and formula 3, $$0.2 < L1\ ape/\text{Imag}H < 0.4 \qquad \text{[formula 1]}$$

$$100\ degrees < FOV < 140\ degrees \qquad \text{[formula 2]}$$

$$TTL < 4.0\ mm \qquad \text{[formula 3]}$$

where 'L1 ape' is half an effective diameter of the first lens, and 'ImagH' is half a diagonal length of the image sensor, 'FOV' is a field of view of an entire optical system including the lens assembly and the image sensor, and 'TTL' is a distance from an object-side surface of a lens barrel to the imaging plane of the image sensor.

2. The electronic device of claim 1, wherein the third lens has a negative refractive power.

3. The electronic device of claim 1, wherein the first lens is convex on the object side.

4. The electronic device of claim 1, wherein the fifth lens is convex on the object side.

5. The electronic device of claim 1, wherein the fifth lens is aspheric to both the object side and the image side.

6. The electronic device of claim 1, wherein the fifth lens includes at least one inflection point.

7. The electronic device of claim 1, wherein the electronic device satisfies formula 4, $$0.6 < TTL/(\text{Imag}H \times 2) < 1.1. \qquad \text{[formula 4]}$$

8. The electronic device of claim 1, wherein the electronic device satisfies formula 5, $$2.0 < f/EPD < 2.5 \qquad \text{[formula 5]}$$

where 'f' is an entire focal length of an entire optical system including the lens assembly and the image sensor, and 'EPD' is a diameter of an entrance pupil of the entire optical system.

9. The electronic device of claim 1, wherein an aperture is disposed between the first lens and the second lens.

10. The electronic device of claim 1, wherein the electronic device satisfies formula 6, $$0.1 < T1/TA < 0.3 \qquad \text{[formula 6]}$$

where 'T1' is a distance from an object-side surface of the first lens to an aperture, and 'TA' is a distance from the object-side surface of the first lens to an image-side surface of the fifth lens.

11. The electronic device of claim 1, wherein the electronic device satisfies formula 7, $$25 \text{ degrees} < L1S2 \text{ sag degree} < 55 \text{ degrees} \qquad \text{[formula 7]}$$

where 'L1S2 sag degree' is an angle in a sagittal direction of an object-side surface of the first lens.

12. The electronic device of claim 1, wherein the electronic device further comprises a processor to apply a stereographic distortion mapping function to the image, thereby resulting in a corrected image, and a display to output the corrected image.

13. The electronic device of claim 12, wherein a distortion of the lens assembly satisfies formula 8, $$-50\% < \text{distortion} < -20\% \qquad \text{[formula 8]}.$$

14. The electronic device of claim 1, wherein the electronic device satisfies formula 9, $$nd5 > 1.6 \qquad \text{[formula 9]}$$

where 'nd5' is a refractive index of the fifth lens.

15. The electronic device of claim 1, wherein upon outputting an image by the image sensor, an image area corresponding to a circular shape having a distance from a center of the image sensor to a long side of the image sensor as a diameter is cropped from the image.

16. An electronic device comprising:
a lens assembly including a plurality of lenses aligned along an optical axis direction from an object side to an image side, wherein the plurality of lenses including,
a first lens having a negative refractive power;
a second lens having a positive refractive power;
a third lens;

a fourth lens; and
a fifth lens having a negative refractive power;
an image sensor including an imaging plane, the image sensor configured to form an image; and
an aperture disposed between the first lens and the second lens;
wherein an effective diameter of the first lens and an effective diameter of the second lens are smaller than an effective diameter of each of the third lens, the fourth lens, and the fifth lens, and
a processor to apply a stereographic distortion mapping function to the image, thereby resulting in a corrected image, and
a display to output the corrected image,
wherein the lens assembly satisfies formula 1, formula 2, and formula 3, $$0.2 < L1 \text{ } ape/\text{Imag}H < 0.4 \qquad \text{[formula 1]}$$

$$100 \text{ degrees} < FOV < 140 \text{ degrees} \qquad \text{[formula 2]}$$

$$TTL < 4.0 \text{ mm} \qquad \text{[formula 3]}$$

where 'L1 ape' is half an effective diameter of the first lens, and 'ImagH' is half a diagonal length of the image sensor, 'FOV' is a field of view of an entire optical system including the lens assembly and the image sensor, and 'TTL' is a distance from an object-side surface of a lens barrel to the imaging plane of the image sensor.

17. The electronic device of claim 16, wherein the electronic device satisfies formula 4 and formula 5, $$0.6 < TTL/(\text{Imag}H \times 2) < 1.1 \qquad \text{[formula 4]}$$

$$2.0 < f/EPD < 2.5 \qquad \text{[formula 5]}$$

where 'f' is an entire focal length of an entire optical system including the lens assembly and the image sensor, and
EPD is a diameter of an entrance pupil of the entire optical system.

18. The electronic device of claim 16, wherein the electronic device satisfies formula 6 and formula 7, $$0.1 < T1/TA < 0.3 \qquad \text{[formula 6]}$$

$$25 \text{ degrees} < L1S2 \text{ sag degree} < 55 \text{ degrees} \qquad \text{[formula 7]}$$

where 'T1' is a distance from an object-side surface of the first lens to the aperture, 'TA' is a distance from the object-side surface of the first lens to an image-side surface of the fifth lens, and 'L1S2 sag degree' is an angle of the object-side surface of the first lens in a sagittal direction.

19. The electronic device of claim 16, wherein a distortion of the lens assembly satisfies formula 8, $$-50\% < \text{distortion} < -20\% \qquad \text{[formula 8]}.$$

20. The electronic device of claim 16, wherein the electronic device satisfies formula 9, $$nd5 > 1.6 \qquad \text{[formula 9]}$$

where 'nd5' is a refractive index of the fifth lens.

* * * * *